United States Patent
Sugiyama

(10) Patent No.: US 10,619,548 B2
(45) Date of Patent: Apr. 14, 2020

(54) PARTICULATE DETECTION SYSTEM

(71) Applicant: NGK Spark Plug Co., LTD., Nagoya (JP)

(72) Inventor: Takeshi Sugiyama, Ichinomiya (JP)

(73) Assignee: NGK Spark Plug Co., LTD., Nagoya (JP)

( * ) Notice: Subject to any disclaimer, the term of this patent is extended or adjusted under 35 U.S.C. 154(b) by 0 days.

(21) Appl. No.: 16/116,484

(22) Filed: Aug. 29, 2018

(65) Prior Publication Data

US 2019/0085748 A1    Mar. 21, 2019

(30) Foreign Application Priority Data

Sep. 19, 2017 (JP) ................. 2017-178966

(51) Int. Cl.
| | |
|---|---|
| G06F 7/12 | (2006.01) |
| F01N 11/00 | (2006.01) |
| G01N 15/08 | (2006.01) |
| G01N 15/06 | (2006.01) |
| G07C 5/08 | (2006.01) |

(Continued)

(52) U.S. Cl.
CPC .............. F01N 11/00 (2013.01); F01N 3/021 (2013.01); F01N 13/008 (2013.01); G01N 15/06 (2013.01); G01N 15/08 (2013.01); G07C 5/085 (2013.01); F01N 2550/04 (2013.01); F01N 2560/05 (2013.01); F01N 2900/0418 (2013.01); F01N 2900/102 (2013.01); F01N 2900/1402 (2013.01); G01N 2015/084 (2013.01)

(58) Field of Classification Search
CPC .............. G01N 15/06; G01N 15/0606; G01N 15/0656; G01N 2015/0046

USPC .................. 701/101, 109, 114; 60/274, 285; 73/23.33, 23.21, 28.01

See application file for complete search history.

(56) References Cited

U.S. PATENT DOCUMENTS

| | | | |
|---|---|---|---|
| 7,794,528 B2 * | 9/2010 | Tochikawa .............. | F01N 3/021 55/282.3 |
| 2012/0234172 A1 | 9/2012 | Sugiyama et al. | |

(Continued)

FOREIGN PATENT DOCUMENTS

| | | |
|---|---|---|
| JP | 2012-194078 A | 10/2012 |
| JP | 2012-220423 A | 11/2012 |

(Continued)

OTHER PUBLICATIONS

Extended European Search Report dated Jan. 10, 2019 for the corresponding European Patent Application No. 18195084.1.

*Primary Examiner* — John Kwon
(74) *Attorney, Agent, or Firm* — Leason Ellis LLP

(57) ABSTRACT

A particulate detection system detects the amount of particulates contained in filtered exhaust gas which has passed through a filter and is discharged to the outside of the vehicle. The particulate detection system includes a sensor disposed on the downstream side of the filter; a sensor circuit section which drives the sensor and obtains in real time a sensor output corresponding to the volumetric particulate amount of the particulates contained in the filtered exhaust gas; and a computation section which computes a distance particulate amount which is the weight or number of the particulates discharged per unit travel distance on the basis of the sensor output obtained by the sensor circuit section, travel distance of the vehicle, and flow rate of the exhaust gas.

7 Claims, 12 Drawing Sheets

(51) Int. Cl.
*F01N 13/00* (2010.01)
*F01N 3/021* (2006.01)

(56) References Cited

U.S. PATENT DOCUMENTS

2012/0262182 A1    10/2012  Matsuoka et al.
2014/0352405 A1*   12/2014  Motomura ......... G01N 15/0656
                                                73/23.31
2015/0114087 A1*    4/2015  Sugiyama ........... G01M 15/102
                                                73/28.01
2015/0120229 A1*    4/2015  Sugiyama .......... G01N 15/0606
                                                702/85
2015/0192545 A1     7/2015  Sugiyama et al.
2016/0103054 A1*    4/2016  Matsuoka .......... G01N 15/0606
                                                73/23.33
2018/0143107 A1*    5/2018  Murase ............... G01M 15/102

FOREIGN PATENT DOCUMENTS

| | | |
|---|---|---|
| JP | 2015-129711 A | 7/2015 |
| WO | WO-99/35480 A | 7/1999 |
| WO | WO-2012/161754 | 11/2012 |
| WO | WO-2017/202947 A | 11/2017 |

\* cited by examiner

PARTICULATE DETECTION SYSTEM

This application claims the benefit of Japanese Patent Application No. 2017-178966, filed Sep. 19, 2017, which is incorporated herein by reference in its entirety.

FIELD OF THE INVENTION

The present invention relates to a particulate detection system which is disposed downstream of a filter for collecting particulates contained in exhaust gas and which detects the amount of particulates contained in the exhaust gas having passed through the filter.

BACKGROUND OF THE INVENTION

Conventionally, there has been known a particulate detection system which detects the amount of particulates (e.g., soot) contained in exhaust gas discharged from an internal combustion engine such as a diesel engine (see Japanese Unexamined Publications No. 2012-220423 and No. 2012-194078). In such a particulate detection system, clean air is externally supplied to a sensor attached to an exhaust pipe, discharge is generated in the clean air so as to produce ions, and the ions are jetted together with the clean air to thereby produce a gas flow from the interior of the sensor toward the outside of the sensor. The ions are caused to adhere to particulates contained in exhaust gas (gas under measurement) introduced into the sensor by the gas flow so as to produce electrified particulates. The electrified particulates are caused to flow out to the outside of the sensor (into the interior of the exhaust pipe), and the ions having failed to adhere to the particulates are collected. On the basis of the magnitude of a sensor current corresponding to the amount of flowed-out charge; i.e., the amount of charge carried by the ions which have adhered to particulates and flowed out to the outside of the sensor (into the interior of the exhaust pipe), the amount of particulates contained in the exhaust gas is determined. Examples indexes of the amount of particulates contained in the exhaust gas include the weight of particulates contained per unit volume of the exhaust gas ($mg/m^3$, hereinafter also referred to as the "volumetric particulate weight") and the number of particulates contained per unit volume of the exhaust gas ($pcs/m^3$, hereinafter also referred to as the "volumetric particulate number"). In the following description, the "volumetric particulate weight" and the "volumetric particulate number" will be collectively referred to as the "volumetric particulate amount." Since the amount of ions which adhere to particulates correlates with the amount of particulates contained in the exhaust gas, the particulate detection system can determine the amount of particulates contained in the exhaust gas from the sensor output current value corresponding to the amount of ions having flowed out.

Also, there has been known a particulates sensor configured to produce a flow of a gas under measurement flowing through the interior of a sensor, without using externally supplied clean air, by utilizing the flow of exhaust gas (external gas) which flows outside the sensor, and to generate discharge within the gas under measurement, thereby producing ions (see Japanese Unexamined Publication No. 2015-129711, FIG. 6, etc.). The particulate sensor of this type operates in the same manner as the above-described particulate detection system. Specifically, ions are caused to adhere to particulates contained in exhaust gas (gas under measurement) so as to produce electrified particulates. The electrified particulates are caused to flow out to the outside of the sensor, and the ions having failed to adhere to the particulates are collected. The amount of particulates contained in the exhaust gas is determined on the basis of the magnitude of the sensor current corresponding to the amount of flowed-out charge; i.e., the amount of charge carried by the ions which have adhered to particulates and flowed out to the outside of the sensor.

Also, WO 2012/161754 discloses a known particulate detection system of a different scheme in which ions are not generated, and the amount of particulates is determined through use of electrified particulates in exhaust gas.

The particulate detection systems of these schemes can detect in real time the mount of particulates contained in exhaust gas; for example, the volumetric particulate weight (unit: $mg/m^3$), which is the weight of particulates contained per unit volume of the exhaust gas.

Problem to be Solved by the Invention

Incidentally, in some cases, a filter is provided in the middle of an exhaust pipe so as to collect particulates contained in exhaust gas discharged from an internal combustion engine. Therefore, the filter for collecting particulates contained in the exhaust gas is repeatedly exposed to high heat due to the exhaust gas of high temperature and execution of regeneration for removing the collected particulates by burning them. Thus, the filter may suffer breakage such as cracking or the like. In such a case, a portion of the exhaust gas is discharged to the outside without collection of particulates by the filter.

Meanwhile, as described above, the particulate detection system detects in real time the amount of particulates contained in exhaust gas. In some cases, the sensor of such a particulate detection system is disposed on the downstream side of the above-described filter. In such a case, a deterioration in the particulate collection characteristics of the filter (an increase in the amount of discharged particulates) can be detected from a change (an increase) in the amount of particulates detected by the particulate detection system.

Notably, in many cases, emission standards that define the permissible amount of particulates discharged from a vehicle are set on the basis of the weight of particulates discharged per unit travel distance (mg/km; hereinafter also referred to as the "distance particulate weight") or the number of particulates discharged per unit travel distance (pcs/km; hereinafter also referred to as the "distance particulate number"). Also, in the following description, the "distance particulate weight" and the "distance particulate number" will also be collectively referred to as the "distance particulate amount".

The present invention has been accomplished in view of the above-described circumstances, and provides a particulate detection system which can properly detect the presence/absence of an anomaly of particulate collection characteristics of a filter disposed upstream of a sensor.

SUMMARY OF THE INVENTION

Means for Solving the Problem

One mode for solving the above-described problem is a particulate detection system for detecting the amount of particulates contained in filtered exhaust gas. The system comprises: a sensor disposed on a downstream side of a filter that collects the particulates from an exhaust gas to form the filtered exhaust gas; a sensor circuit section which drives a sensor and obtains in real time a sensor output corresponding to the volumetric particulate amount of the particulates contained in the filtered exhaust gas; and a computation section which computes a distance particulate amount which is the weight or number of the particulates discharged per unit travel distance based on the sensor output, travel distance of a vehicle, and a flow rate of the exhaust gas.

In this particulate detection system, the computation section computes a distance particulate amount (specifically, a distance particulate weight (mg/km) or a distance particulate number (pcs/km)) on the basis of a sensor output corresponding to a volumetric particulate amount (specifically, a volumetric particulate weight ($mg/m^3$) or a volumetric particulate number ($pcs/m^3$)) of particulates contained in the filtered exhaust gas, the travel distance of the vehicle, and the flow rate of the exhaust gas. Therefore, the distance particulate amount used for judging whether the particulate collection characteristics of the filter are normal or anomalous can be obtained easily.

No limitation is imposed on the "sensor" and the "sensor circuit section" so long as they constitute a particulates sensor which can obtain, in real time, a sensor output corresponding to the volumetric particulate amount of the particulates contained in the exhaust gas. For example, a particulates sensor of a scheme described in Japanese Unexamined Publications No. 2012-220423, No. 2012-194078 and No. 2015-129711 or a scheme described in WO 2012/161754 may be used as the "sensor" and the "sensor circuit section."

The "sensor output" obtained by the sensor circuit section varies depending on the configurations of the sensor and the sensor circuit section. Examples of the sensor output include an output current value (the value of output current) corresponding to the volumetric particulate amount and an output voltage value (the value of output voltage) corresponding to the volumetric particulate amount. The sensor output may be a value obtained by performing numerical processing such as conversion on these values, such as the output current value.

The amount of particulates contained in the exhaust gas and the amount of particulates contained in the filtered exhaust gas change moment by moment in accordance with the traveling state of the vehicle; specifically, in accordance with the operation state of the engine. Such a change may occur within a time period of 1 second or less. Accordingly, the expression "the sensor circuit section obtains the sensor output in real time" means that the sensor and the sensor circuit section are configured such that, in periods during which particulates can be detected, the sensor and the sensor circuit section can obtain the sensor output indicating the amount of the particulates in the filtered exhaust gas at that point in time, with a delay time of several seconds or less.

Notably, the expression "the period during which particulates can be detected" is used so as to exclude periods during which particulates cannot be detected, such as recovery periods during which, in order to recover or maintain the particulate detection characteristics of the sensor, a portion of the sensor is heated so as to remove particulates having adhered thereto.

The "filter" is a member which filters the exhaust gas and collects particulates contained therein. Examples of the filter include a DPF for a diesel engine and a GPF for a gasoline engine.

As described above, the "distance particulate amount" is a general term for the "distance particulate weight" and the "distance particulate number." The distance particulate weight is the weight of particulates discharged per unit travel distance of the vehicle and is expressed, for example, in mg/km. The distance particulate number is the number of particulates discharged per unit travel distance of the vehicle and is expressed, for example, in pcs/km.

The "travel distance" of the vehicle is preferably a travel distance which is computed on the basis of a signal (vehicle speed pulse signal) output from a separately provided rotation sensor which detects rotation of an axle of the vehicle. Specifically, it is preferred that the signal output from the axle rotation sensor is received by an ECU provided internally or externally of the present system, and the speed or travel distance of the vehicle is computed for use. Alternatively, a travel distance which is computed from a map by a navigation system through use of GPS signals, etc. may be received and used by the ECU. Notably, the travel distance may be individually computed by the computation section of the present system without sharing the output from the axle rotation sensor with others.

The "flow rate" of the exhaust gas is obtained as follows. The output of a flow rate sensor separately attached to the exhaust pipe is obtained by the ECU provided externally or internally of the present system, and the flow rate of the exhaust gas is computed by the ECU from the output of the flow rate sensor. Preferably, the computation section of the present system obtains the flow rate of the exhaust gas from the ECU and uses it for computation of the distance particulate amount or the like, or the ECU provided internally of the present system uses the flow rate of the exhaust gas for computation of the distance particulate amount or the like. In the case where the flow rate sensor is not provided, preferably, the flow rate of the exhaust gas is obtained by the ECU through calculation using the fuel injection amount, the intake air amount, the engine rotational speed, etc. The computation section of the present system obtains the flow rate of the exhaust gas from the ECU and uses it for the computation of the distance particulate amount, etc. Alternatively, the ECU provided internally of the present system uses the flow rate of the exhaust gas for computation of the distance particulate amount or the like. Notably, the flow rate of the exhaust gas may be individually computed without sharing the output of the flow rate sensor, etc. with others.

In the above-described particulate detection system, preferably, the computation section includes: a particulate amount computation section which computers the volumetric particulate amount using the sensor output obtained at predetermined time intervals; a first integration section which integrates the volumetric particulate amount over a predetermined detection period to thereby compute an integral volumetric particulate amount in the detection period; and a first computation section which computes the distance particulate amount on the basis of the integral volumetric particulate amount, the travel distance, and the flow rate.

In this system, after an integral volumetric particulate amount over the detection period is obtained by the first integration section, the distance particulate amount is computed by the first computation section on the basis of the integral volumetric particulate amount, the travel distance, and the flow rate. Therefore, the distance particulate amount (the distance particulate weight (mg/km) or the distance particulate number (pcs/km)) averaged in the detection period can be computed easily.

Notably the "integral volumetric particulate amount" is a general term for an "integral volumetric particulate weight" and an "integral volumetric particulate number." The integral volumetric particulate weight ($mg/m^3$) is obtained by integrating the volumetric particulate weight over the detection period, and the integral volumetric particulate number (pcs/m$^3$) is obtained by integrating the volumetric particulate number over the detection period.

Also, the above-described integral volumetric particulate amount (the integral volumetric particulate weight or the integral volumetric particulate number) may be a "moving integral volumetric particulate amount" (a "moving integral volumetric particulate weight" or a "moving integral volumetric particulate number") which is obtained by starting each of detection periods having a fixed length such that the start of each detection period is shifted by a predetermined moving period from the start of the previous detection period, and integrating the volumetric particulate amount every time the moving period elapses (the end of each detection period comes).

The above-described distance particulate amount (the distance particulate weight or the distance particulate number) may be a "moving distance particulate amount" (a "moving distance particulate weight" or a "moving distance particulate number" which is obtained by starting each of detection periods having a fixed length such that the start of each detection period is shifted by a predetermined moving period from the start of the previous detection period, and calculating the distance particulate amount every time the moving period elapses (the end of each detection period comes).

Examples of the "predetermined detection period" include a period having a fixed length (e.g., 10 minutes, 30 minutes, etc.), a drive period from the start of travel of the vehicle to the stoppage of the vehicle, and an engine operation period from the start of the engine to the stoppage of the engine.

The "predetermined time interval" is a sampling interval for obtaining the sensor output. Preferably, the time interval is a short time interval determined such that during the time interval, the amount of the particulates contained in the filtered exhaust gas can be considered to be approximately constant. Examples of the time intervals are time intervals of several seconds or shorter (e.g., 0.1 sec, 1 sec, etc.)

In the above-described particulate detection system, preferably, the detection period is a moving detection period which has a fixed length and whose start timing shifts by a predetermined moving period each time; the first integration section is configured to compute a moving integral volumetric particulate amount which is the integral volumetric particulate amount for each moving detection period; and the first computation section is configured to compute a moving distance particulate amount which is the distance particulate amount for each moving detection period.

As described above, in the case where the filter is broken (e.g., cracking), and a portion of exhaust gas having passed through the broken portion of the filter mixes with the filtered exhaust gas, after the breakage of the filter, the sensor output permanently shifts toward a side where the sensor output shows that the amount of the particulates is large, as compared with the case where cracking or the like did not occur.

In this system, since the moving distance particulate amount in each moving detection period is obtained in the first moving computation section, a long-term change in the distance particulate amount can be detected easily. Accordingly, the permanent shift in the sensor output due to breakage of the filter can be detected appropriately.

Notably, the length of the "moving detection period" is preferably set such that, as a result of the effect of averaging attained through use of the integral volumetric particulate amount, each of the computed moving distance particulate amounts is not affected by a short-term change in the sensor output. An example of the moving detection period is a constant period of 10 minutes or longer.

The length of the "moving period" which is the magnitude of the shift of the start of the moving detection period may be the same as the length of the above-described "predetermined time interval" for obtaining the sensor output. Alternatively, the length of the "moving period" may be an integer multiple of the "predetermined time interval." For example, the "predetermined moving period" may be set to 100 times of the "predetermined time interval" (for example, 0.1 second); i.e., 10 seconds, or to 600 times the "predetermined time interval"; i.e., one minute.

In the above-described particulate detection system, preferably, the computation section includes: a travel distance obtainment section which externally obtains the travel distance over which the vehicle has travelled during the detection period or computes the travel distance from travel distance data externally obtained; and a flow rate obtainment section which externally obtains the flow rate of the exhaust gas discharged from the engine during the detection period or computes the flow rate from flow rate data eternally obtained.

In this system, since the travel distance obtainment section and the flow rate obtainment section are further provided in the computation section, the distance particulate amount in the detection period can be computed more easily.

In the case where the travel distance obtainment section externally obtains the travel distance, for example, the following method may be employed so as to obtain the travel distance. An ECU which always computes the total travel distance is caused to compute the travel distance in the detection period from a value of the total travel distance at the start of the detection period and a value of the total travel distance at the end of the detection period, and the travel distance obtainment section obtains and utilizes the travel distance computed by the ECU. Notably, the ECU may be provided externally of the present system in some cases or provided internally of the present system in some cases. In the case where the ECU is provided internally of the present system, the ECU itself may function as the travel distance obtainment section and utilize the travel distance computed by the ECU itself.

In the case where the travel distance obtainment section computes the travel distance from data externally obtained, for example, the following method may be employed for computation of the travel distance. The first computation section of the present system itself obtains a signal from a rotation sensor for detecting the rotation of the axle over a period from the start of the detection period to the end of the detection period, and the travel distance obtainment section computes the travel distance from the number of rotations of the wheels obtained from this signal. In an alternative method, separately from the ECU, the first computation section of the present system itself always computes the total travel distance, obtains a value of the total travel distance at the start of the detection period and a value of the total travel distance at the end of the detection period, and computes the travel distance in the detection period from the difference between these values. In an alternative method, data representing the value of the total travel distance at the start of the detection period and the value of the total travel distance at the end of the detection period are obtained from an ECU which is provided externally of the present system and which always computes the total travel distance, and the first computation section computes the travel distance in the detection period from the difference between these values.

In the case where the flow rate obtainment section externally obtains the flow rate of the exhaust gas discharged during the detection period, for example, the following method may be employed so as to obtain the flow rate of the exhaust gas. In some case, the ECU obtains the output of a flow rate sensor separately provided on the exhaust pipe, obtains the flow rate of the exhaust gas at each point in time, and computes the flow rate of the exhaust gas discharged during the detection period by using this. In such a case, the flow rate obtainment section of the present system obtains from this ECU the flow rate of the exhaust gas discharged during the detection period. In the case where the flow rate sensor is not provided, the ECU may compute the flow rate of the exhaust gas discharged during the detection period by using the fuel injection amount, the intake air amount, the engine speed, etc. In such a case, the flow rate obtainment section of the present system obtains from this ECU the flow rate of the exhaust gas discharged during the detection period. Notably, as described above, the ECU may be provided externally of the present system in some cases or provided internally of the present system in some cases. In the case where the ECU is provided internally of the present system, the ECU itself may function as the flow rate obtainment section and utilize the flow rate of the exhaust gas discharged during the detection period, which flow rate is computed by itself.

In the case where the flow rate obtainment section computes the flow rate of the exhaust gas from the data externally obtained, for example, the following method may be employed so as to compute the flow rate. The flow rate obtainment section of the present system computes the flow rate of the exhaust gas discharged during the detection period by obtaining the output of the separately provided flow rate sensor through the ECU or directly obtaining the output of the flow rate sensor without mediation of the ECU. In an alternative method, the ECU obtains the output of the separately provided flow rate sensor and obtains the flow rate of the exhaust gas at each point in time, and the flow rate obtainment section of the present system obtains the flow rate of the exhaust gas at each point in time from the ECU and computes the flow rate of the exhaust gas discharged during the detection period by itself. In the case where the flow rate sensor is not provided, the ECU may compute the flow rate of the exhaust gas at each point in time by using the fuel injection amount, the intake air amount, the engine speed, etc. In such a case, the flow rate obtainment section of the present system obtains the flow rate of the exhaust gas at each point from this ECU and computes the flow rate of the exhaust gas discharged during the detection period by itself.

In the above-described particulate detection system, preferably, the computation section includes: a particulate amount computation section which computers the volumetric particulate amount using the sensor output obtained at predetermined time intervals; a second integration section which integrates the volumetric particulate amount over a detection travel period to compute an integral volumetric particulate amount in the detection travel period, said detection travel period corresponding to a distance equal to or greater than a predetermined detection travel distance; and a second computation section which computes the distance particulate amount based on the integral volumetric particulate amount, the travel distance, and the flow rate.

In this system, after the integral volumetric particulate amount over the detection travel period, by the end of which the travel distance becomes equal to or greater than the detection travel distance, is computed by the second integration section, the distance particulate amount is computed by the second computation section on the basis of the integral volumetric particulate amount, the travel distance, and the flow rate. Therefore, the averaged distance particulate amount in the detection travel period can be computed easily.

An example of the "detection travel distance" is a fixed travel distance such as 1.0 km, 10 km, 20 km, etc.

The "predetermined time interval" is a sampling interval for obtaining the sensor output. Preferably, the time interval is a short time interval determined such that during the time interval, the amount of the particulates contained in the filtered exhaust gas can be considered to be approximately constant. Examples of the time intervals are 0.1 sec and 1 sec.

In the above-described particulate detection system, preferably, the computation section includes: a travel distance obtainment section which externally obtains the travel distance over which the vehicle has travelled or computes the travel distance from data externally obtained; and a flow rate obtainment section which externally obtains the flow rate of the exhaust gas discharged during the detection travel period from the outside or computes the flow rate from data externally obtained.

In this particulate detection system, since the travel distance obtainment section and the flow rate obtainment section are further provided in the computation section, the distance particulate amount in the detection travel period can be computed more easily.

In the case where the travel distance obtainment section externally obtains the travel distance, for example, the following method may be employed in order to obtain the travel distance. The ECU which always computes the total travel distance is caused to compute, from a value of the total travel distance at the start of the detection travel period and a value of the total travel distance at each point in time, the travel distance at that point in time, and the travel distance obtainment section obtains the travel distance computed by the ECU. The travel distance obtained by the travel distance obtainment section is compared with the detection travel distance for the judgment as to whether or not the travel distance becomes equal to or greater than the detection travel distance. Notably, the ECU may be provided externally of the present system in some cases or provided internally of the present system in some cases. In the case where the ECU is provided internally of the present system, the ECU itself may function as the travel distance obtainment section and utilize the travel distance computed by the ECU itself.

In the case where the travel distance obtainment section computes the travel distance from data externally obtained, for example, the following method may be employed for computation of the travel distance. The second computation section of the present system itself obtains, at each point in time from the start of the detection travel period, a signal from a rotation sensor for detecting the rotation of the axle, and the travel distance obtainment section computes the travel distance at that point in time from the number of rotations of the wheels obtained from this signal. In an alternative method, separately from the ECU, the second computation section of the present system itself always computes the total travel distance, obtains a value of the calculated total travel distance at the start of the detection travel period and a value of the total travel distance at each point in time, and computes the travel distance at that point in time from the difference between these values. In an alternative method, data representing the value of the total travel distance at the start of the detection travel period and the value of the total travel distance at each point in time are obtained from an ECU which is provided externally of the present system and which always computes the total travel distance, and the second computation section computes the travel distance at that point in time from the difference between these values.

In the case where the flow rate obtainment section externally obtains the flow rate of the exhaust gas discharged during the detection travel, for example, the following method may be employed so as to obtain the flow rate of the exhaust gas. In some case, the ECU obtains the output of a flow rate sensor separately provided on the exhaust pipe, obtains the flow rate of the exhaust gas at each point in time, and computes the flow rate of the exhaust gas discharged during the detection travel period by using this. In such a case, the flow rate obtainment section of the present system obtains from this ECU the flow rate of the exhaust gas discharged during the detection travel period. In the case where the flow rate sensor is not provided, the ECU may compute the flow rate of the exhaust gas discharged during the detection travel period by using the fuel injection amount, the intake air amount, the engine speed, etc. In such a case, the flow rate obtainment section of the present system obtains from this ECU the flow rate of the exhaust gas discharged during the detection travel period. Notably, as described above, the ECU may be provided externally of the present system in some cases or provided internally of the present system in some cases. In the case where the ECU is provided internally of the present system, the ECU itself may function as the flow rate obtainment section and utilize the flow rate of the exhaust gas discharged during the detection travel period, which flow rate is computed by itself.

In the case where the flow rate obtainment section computes the flow rate of the exhaust gas from the data externally obtained, for example, the following method may be employed so as to compute the flow rate. The flow rate obtainment section of the present system computes the flow rate of the exhaust gas discharged during the detection travel period by obtaining the output of the separately provided flow rate sensor through the ECU or directly obtaining the output of the flow rate sensor without mediation of the ECU. In an alternative method, the ECU obtains the output of the separately provided flow rate sensor and obtains the flow rate of the exhaust gas at each point in time, and the flow rate obtainment section of the present system obtains the flow rate of the exhaust gas at each point in time from the ECU and computes the flow rate of the exhaust gas discharged during the detection travel period by itself. In the case where the flow rate sensor is not provided, the ECU may compute the flow rate of the exhaust gas at each point in time by using the fuel injection amount, the intake air amount, the engine speed, etc. In such a case, the flow rate obtainment section of the present system obtains the computed flow rate of the exhaust gas at each point from this ECU and computes the flow rate of the exhaust gas discharged during the detection travel period by itself.

In the above-described particulate detection system, preferably, the computation section includes a judgment section which makes a judgement whether or not particulate collection characteristics of the filter are anomalous based on the computed distance particulate amount.

Since this system includes a judgment section which judges whether or not the particulate collection characteristics of the filter are anomalous by using the computed distance particulate amount, the judgment as to whether the filter is normal or anomalous can be made properly through use of the output of the sensor.

In the judgment section, the judgment as to whether or not the particulate collection characteristics of the filter are anomalous can be made on the basis of the distance particulate amount, for example, by the following method. When the magnitude of the obtained distance particulate amount is greater than a predetermined judgment threshold value, the particulate collection characteristics of the filter are judged to be anomalous, and when the magnitude of the obtained distance particulate amount is equal to or less than the predetermined judgment threshold value, the particulate collection characteristics of the filter are judged not to be anomalous.

In the above-described particulate detection system, preferably, the computation section includes a judgment determination section which determines that the filter is anomalous when a judgement pattern by the judgment section satisfies a predetermined judgment condition.

In this system, the judgment determination section of the computation section determines that the filter is anomalous in the case where the pattern of appearance of the judgment made in the judgment section and indicating presence of an anomaly satisfies a predetermined judgment condition. Therefore, the judgment as to whether the filter is normal or anomalous can be made more reliably.

Examples of the pattern of appearance of the judgment indicating the presence of an anomaly, which pattern is used as a judgment condition are as follows:

the case where the judgment made in the judgment section and indicating presence of an anomaly continuously appears a predetermined number of times (for example, 5 times);

the case where the number of times of the judgment made in the judgment section and indicating presence of an anomaly exceeds a predetermined number of times (for example, 10 times); and the case where the judgment made in the judgment section and indicating presence of an anomaly appears a predetermined number of times or more within a predetermined time.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Modes for Carrying Out the Invention

Embodiment

Figure 1:
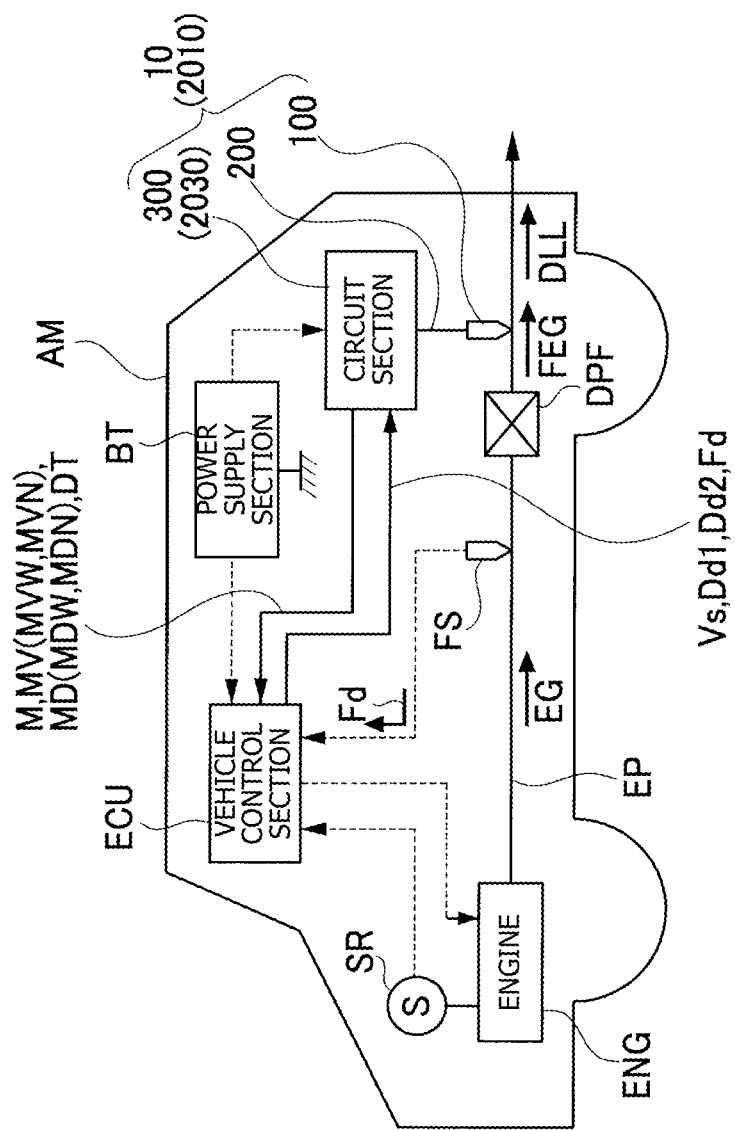
FIG. 1 shows an embodiment and a second modification and is an explanatory view used for describing the configuration of a vehicle in which a particulate detection system is applied to an exhaust pipe of an engine.
Figure 2:
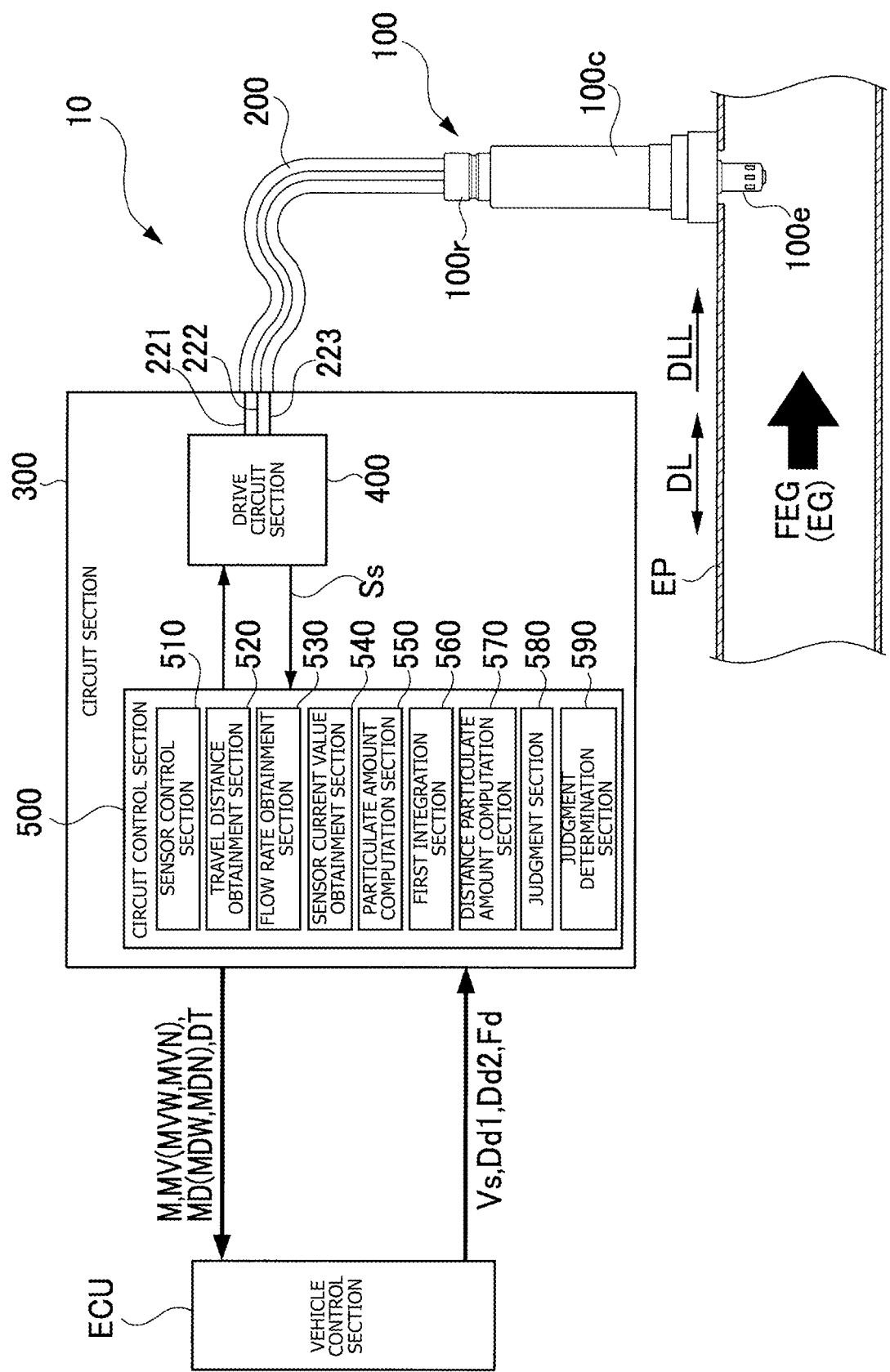
FIG. 2 shows the embodiment and is an explanatory view of the particulate detection system whose sensor is attached to the exhaust pipe.
Figure 3:
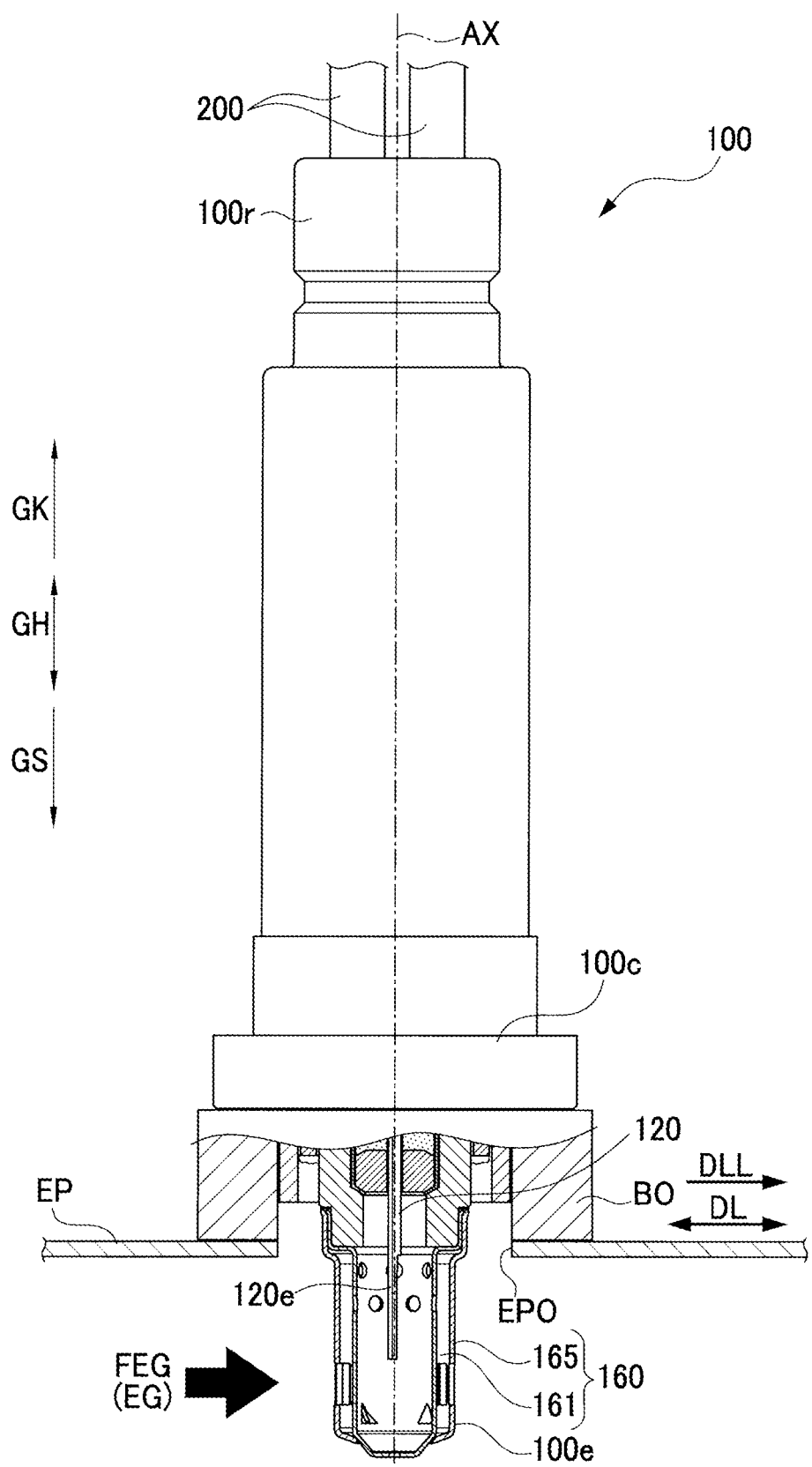
FIG. 3 shows the embodiment, a first modification, and the second modification and is a partially sectioned view of the sensor of the particulate detection system attached to the exhaust pipe.
Figure 4:
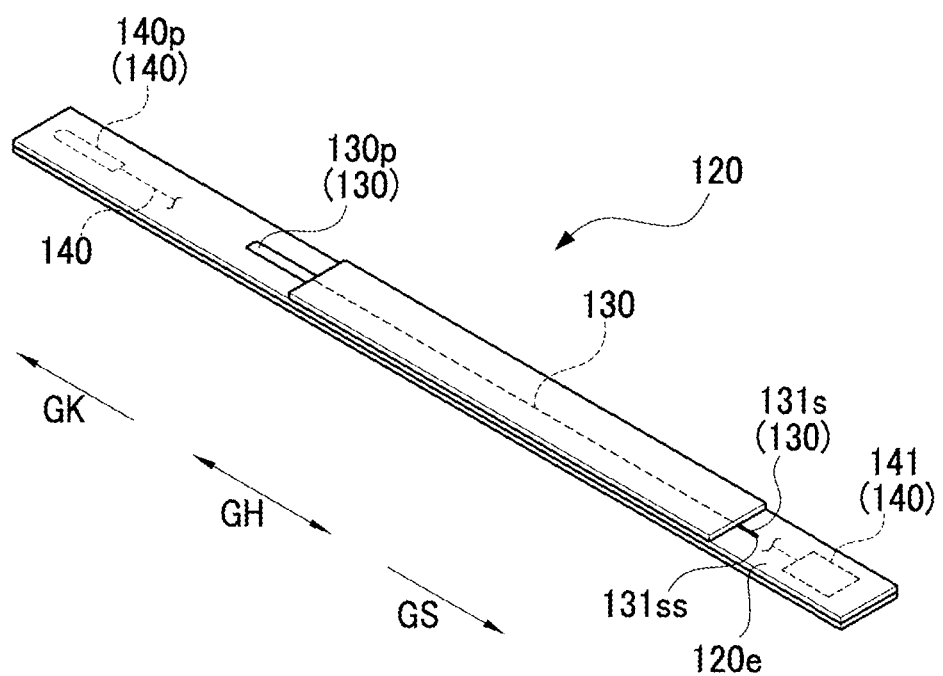
FIG. 4 shows the embodiment, the first modification, and the second modification and is a perspective view of a ceramic element used in the sensor.
Figure 5:
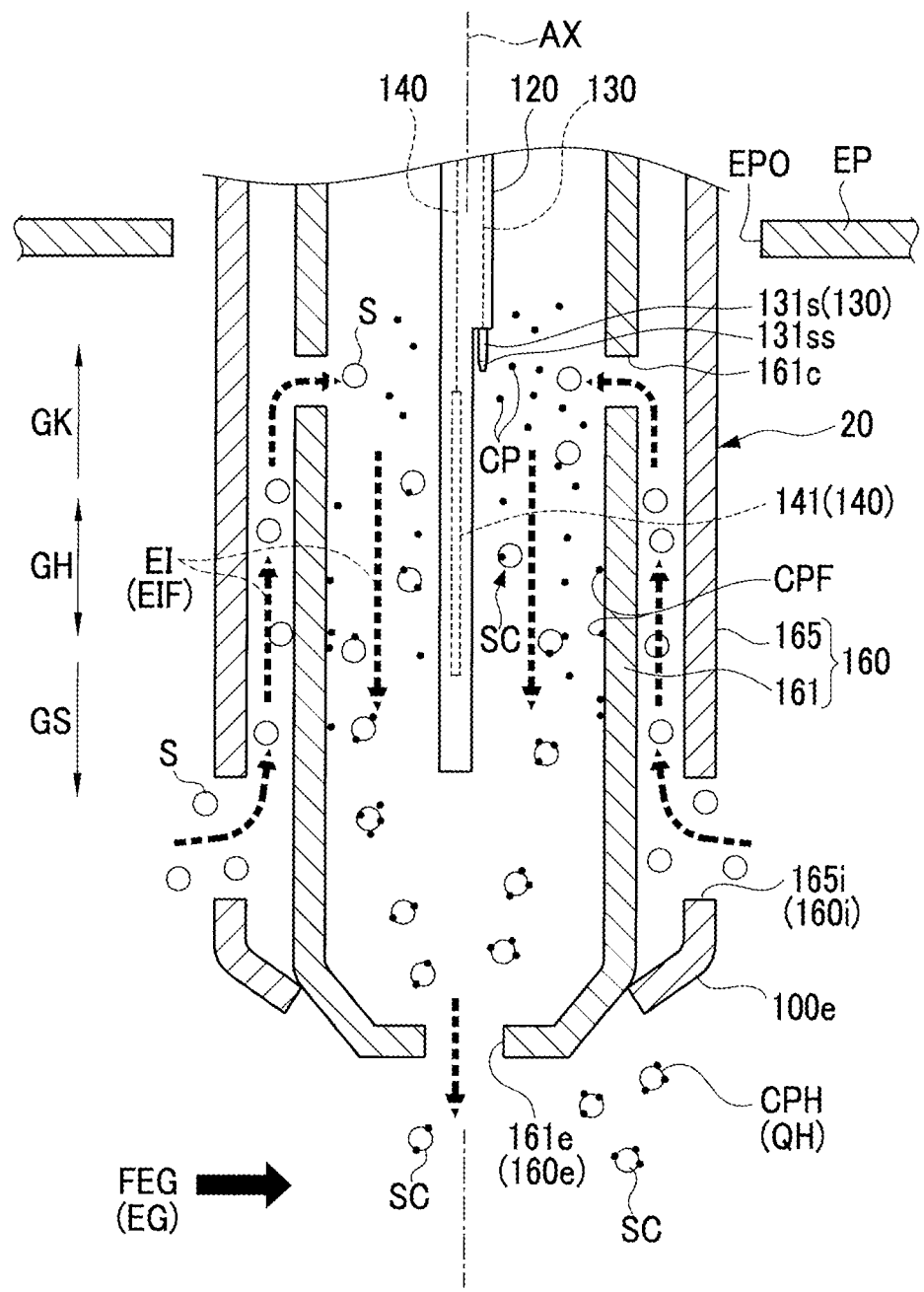
FIG. 5 shows the embodiment, the first modification, and the second modification and is an explanatory view schematically showing the introduction, electrification, and discharge of particulates in the sensor.
Figure 6:
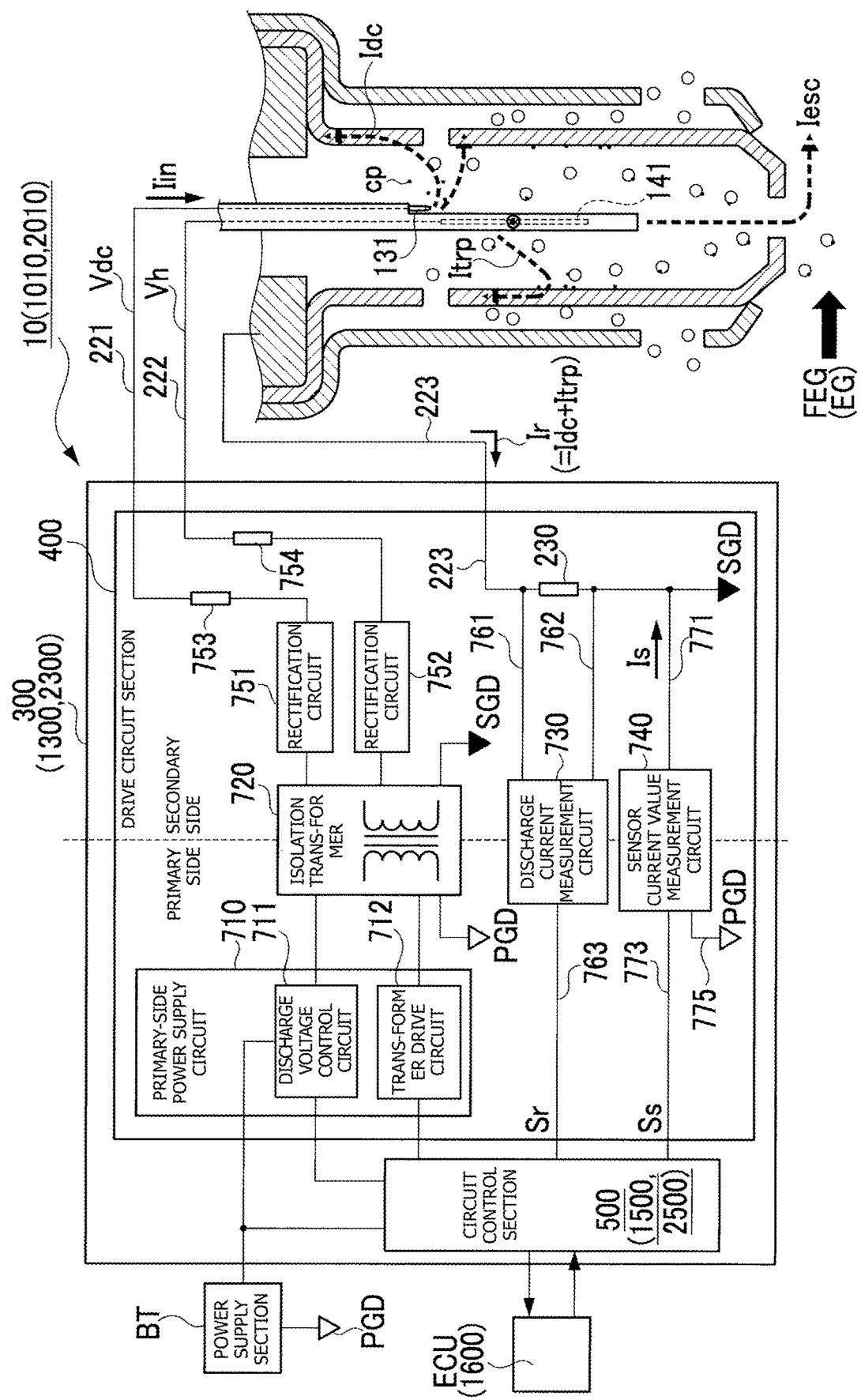
FIG. 6 shows the embodiment, the first modification, and the second modification and is an explanatory view showing the configuration of a circuit section and the connection between the circuit section and the sensor.
Figure 7:
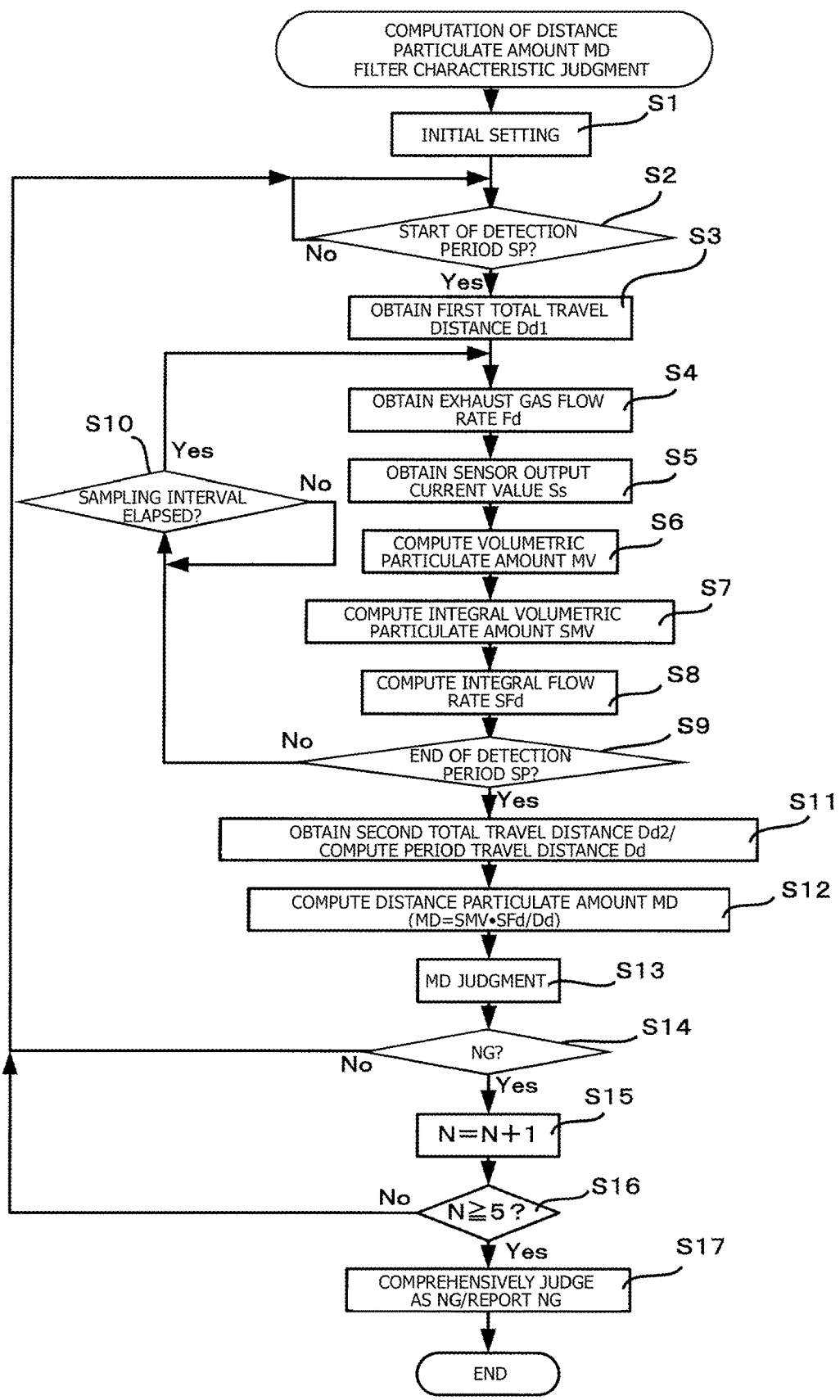
FIG. 7 shows the embodiment, the first modification, and the second modification and is a flowchart showing the steps for computation of a distance particulate amount MD (a distance particulate weight MDW or a distance particulate number MDN) and judgment of the characteristics of a filter DPF.

An embodiment of the present technique will be described with reference to the drawings. FIG. 1 shows the configuration of a vehicle AM in which a particulate detection system 10 is applied to an exhaust pipe EP of an engine ENG. FIG. 2 shows the configuration of the particulate detection system 10 whose sensor 100 is attached to the exhaust pipe EP. FIG. 3 shows a partially sectioned view of the sensor 100 attached to the exhaust pipe EP. FIG. 4 shows a perspective view of a ceramic element 120 used in the sensor 100. FIG. 5 schematically shows the introduction, electrification, and discharge of particulates S in the sensor 100. FIG. 6 shows the configuration of a circuit section 300 of the particulate detection system 10 and the connection between the circuit section 300 and the sensor 100 through a cable 200. FIG. 7 shows the steps of obtaining the amount M of particulates from an obtained sensor output current value Ss and determining whether or not a filter DPF is broken, which steps are performed in the circuit control section 500 of the circuit section 300.

Notably, in the axial direction GH (the vertical direction in FIG. 3 and the upper-left—lower-right direction in FIG. 4) along an axial line AX of the sensor 100, the side (the lower side in FIG. 3, the lower-right side in FIG. 4) where the sensor 100 is attached to the exhaust pipe EP will be referred to as a distal end side GS, and the side (the upper side in FIG. 3, the upper-left side in FIG. 4) where the sensor 100 is disposed outside the exhaust pipe EP will be referred to as a proximal end side GK.

The vehicle AM includes the diesel engine ENG controlled by a vehicle control section ECU. The vehicle control section ECU is driven by a power supply section BT composed of a battery. The filter DPF for collecting and removing particulates S from exhaust gas EG is disposed in the middle of the exhaust pipe EP of the engine ENG, and filtered exhaust gas FEG having passed through the filter DPF is discharged to the outside. Various sensors SR, such as a rotational speed sensor for detecting the engine rotational speed, are attached to the engine ENG. The vehicle control section ECU controls the engine ENG by utilizing the outputs of the sensors SR. A flow rate sensor FS for detecting, in real time, the flow rate Fd of the exhaust gas EG is attached to the exhaust pipe EP to be located on the upstream side of the filter DPF, and its output representing the flow rate Fd is input to the vehicle control section ECU.

The particulate detection system 10 is mounted in the vehicle AM. The particulate detection system 10 includes the sensor 100, the circuit section 300, and the cable 200 for establishing electrical connection therebetween, and measures the amount M of particulates S (e.g., soot) contained in the filtered exhaust gas FEG. The sensor 100 of the particulate detection system 10 is attached to the exhaust pipe EP to be located on the downstream side DLL (the right side in FIG. 1) of the filter DPF. The circuit section 300 operates through use of power supplied from the power supply section BT, drives the sensor 100, obtains the sensor output current value Ss of the sensor output current Is whose magnitude corresponds to the amount M of the particulates S contained in the filtered exhaust gas FEG (specifically, a volumetric particulate weight MVW ($mg/m^3$) which is the weight of the particulates per unit volume), computes a volumetric particulate weight MVW corresponding thereto, and transmits the volumetric particulate weight MVW to the vehicle control section ECU. As shown in FIG. 2, the circuit section 300 includes not only a drive detection circuit section 400 for driving the sensor 100 but also a circuit control section 500 which controls the drive detection circuit section 400, obtains the sensor output current value Ss measured by the drive detection circuit section 400, and outputs to the vehicle control section ECU a signal representing the volumetric particulate weight MVW of the particulates S contained in the filtered exhaust gas FEG. The circuit control section 500 is a microcomputer which includes a CPU, a ROM, a RAM, etc., and operates in accordance with a predetermined control program.

Notably, in the circuit section 300, a volumetric particulate number MVN ($pcs/m^3$) which corresponds to the obtained sensor output current value Ss and is the number of the particulates per unit volume may be computed and transmitted to the vehicle control section ECU.

The vehicle control section ECU, which is provided externally of the present system 10, controls the state of combustion in the engine ENG, the amount of fuel supplied to the engine ENG, the fuel supply timing, etc. on the basis of the signals supplied from the various sensors SR and the flow rate sensor FS attached to the engine ENG, etc. Also, the vehicle control section ECU is configured to turn on a warning display for a driver at a specific location within a dashboard (not shown) by using the volumetric particulate weight MVW (or the volumetric particulate number MVN) or in accordance with a signal reporting an anomaly of the particulate collection characteristics of the filter DPF. The volumetric particulate weight or number and the signal are input from the particulate detection system 10 (the circuit section 300).

As shown in FIGS. 2 and 3, the sensor 100 of the particulate detection system 10 has a cylindrical distal end portion 100e. The sensor 100 is fixed to the exhaust pipe EP through a boss BO in a state in which the distal end portion 100e is inserted into the exhaust pipe EP through an insertion opening EPO formed in the exhaust pipe EP and the axial line AX of the sensor 100 extends orthogonal to the extension direction DL of the exhaust pipe EP. The distal end portion 100e is composed of the ceramic element 120 (see FIG. 4) which has the shape of a rectangular plate and whose distal end portion 120e projects toward the distal end side GS (the lower side in FIG. 5) along the axial line AX, and a protector 160 which surrounds the circumference of the distal end portion 120e of the ceramic element 120 and the end of the distal end portion 120e on the distal end side GS. The protector 160 has introduction openings 160i for introducing a gas under measurement EI which is a portion of the filtered exhaust gas FEG, and a discharge opening 160e for discharging the gas under measurement EI.

The ceramic element 120 shown in FIGS. 4 and 5 is formed by stacking a plurality of insulating layers made of alumina ceramic and has a rectangular plate-like shape. The ceramic element 120 includes a discharge wiring conductor 130 and an auxiliary electrode wiring conductor 140. As will be described later, a discharge voltage Vdc generated by the drive detection circuit section 400 is applied to the discharge wiring conductor 130, and an auxiliary voltage Vh generated by the drive detection circuit section 400 is applied to the auxiliary electrode wiring conductor 140.

A terminal pad 130p of the discharge wiring conductor 130 on the proximal end side GK and a needle-shaped discharge electrode body 131s of the discharge wiring conductor 130 on the distal end side GS are exposed to the outside. Although not illustrated, the terminal pad 130p of the discharge wiring conductor 130 on the proximal end side GK is connected a discharge voltage line 221 of the cable 200 within the sensor 100. Meanwhile, the discharge electrode body 131s of the discharge wiring conductor 130 is exposed to the gas under measurement EI within the protector 160 as shown in FIG. 5. The discharge electrode body 131s (see FIG. 5) has a sharpened distal end portion 131ss. When the discharge voltage Vdc is applied to the discharge electrode body 131s, gaseous discharge (corona discharge) occurs between the distal end portion 131ss and the protector 160.

An auxiliary electrode pad 141 of the auxiliary electrode wiring conductor 140, which pad is located at the distal end of the ceramic element 120, is located on the distal end side GS of the discharge electrode body 131s of the discharge wiring conductor 130 and is embedded in the distal end portion 120e of the ceramic element 120. As will be described later, an electric field is produced between the protector 160 and the auxiliary electrode pad 141 so as to promote the collection of floating ions CPF by the protector 160. Meanwhile, a terminal pad 140p of the auxiliary electrode wiring conductor 140 on the proximal end side GK is exposed to the outside on the surface (the back surface in FIG. 4) of the ceramic element 120 opposite the above-mentioned terminal pad 130p as indicated by a broken line in FIG. 4. Although not illustrated, the terminal pad 140p is connected an auxiliary voltage line 222 of the cable 200 within the sensor 100.

As shown in FIGS. 3 and 5, the protector 160 is a cylindrical double-wall protector formed of stainless steel and is composed of an inner protector 161 and an outer protector 165 surrounding the outer circumference of the inner protector 161. A plurality of introduction openings 165i (160i) for introducing a portion of the filtered exhaust gas FEG into the protector 160 as the gas under measurement EI are formed in a circumferential portion of the protector 160 (the outer protector 165) located on the distal end side GS. Meanwhile, a discharge opening 161e (160e) for discharging the gas under measurement EI to the outside (into the interior of the exhaust pipe EP) is provided in a distal end portion of the protector 160 (the inner protector 161). Also, communication holes 161c for establishing communication between the interior of the outer protector 165 and the interior of the inner protector 161 are formed in a portion of the inner protector 161, which portion is located on the proximal end side GK (the upper side in FIG. 5) in relation to the introduction openings 165i. Notably, as shown in FIG. 6, the protector 160 electrically communicates with a secondary-side ground SGD (which will be described later) through a return current line 223 and a current detection resistor 230.

When the engine ENG is operated and the exhaust gas EG and the filtered exhaust gas FEG having passed through the filter DPF flow, due to presence of the protector 160, the so-called Venturi effect occurs, whereby the atmospheric pressure near the discharge opening 160e of the protector 160 drops. Thus, the gas (the gas under measurement EI which is a portion of the filtered exhaust gas FEG) within the protector 160 (the inner protector 161) is sucked out through the discharge opening 160e. As a result, as indicted by broken line arrows in FIG. 5, measurement gas flows EIF are produced within the protector 160. The measurement gas flows EIF are flows of the gas under measurement EI which enters the interior of the protector 160 through the introduction openings 165i (160i), flows through the communication holes 161c, and is discharged from the discharge opening 161e (160e).

When the drive detection circuit section 400 applies a DC discharge voltage Vdc (for example, +1 to 2 kV with respect to the secondary-side ground SGD) to the discharge electrode body 131s of the ceramic element 120 in this state, as shown in FIG. 6, gaseous discharge (more specifically, corona discharge) occurs between the distal end portion 131ss thereof and the protector 160 (the inner protector 161), and an input current Iin flows through the discharge voltage line 221. Also, a discharge current Idc flows into the inner protector 161. Simultaneously with this, in a space around the distal end portion 131ss, nitrogen molecules $N_2$, oxygen molecules $O_2$, etc. contained in the filtered exhaust gas FEG are ionized, and as a result, positive ions CP indicated by black dots in FIGS. 5 and 6 are produced.

As described above, flows EIF of the gas under measurement from the introduction openings 160i toward the discharge opening 160e indicated by broken line arrows in FIG. 5 are produced within the outer protector 165 and the inner protector 161. Near the distal end portion 120e of the ceramic element 120, a flow EIF of the gas under measurement from the proximal end side GK toward the distal end side GS is produced. Therefore, the produced positive ions CP are mixed with the gas under measurement EI and adhere to the particulates S (indicated by white circles) within the gas under measurement EI as shown in FIGS. 5 and 6. As a result, the particulates S become positively electrified particulates SC, which flow toward the discharge opening 160e (161e) as a result of the flow EIF of the gas under measurement and is discharged to the outside of the protector 160; i.e., the outside of the sensor 100 (however, within the exhaust pipe EP). As a result, a leak current Iesc flows to the outside (the primary-side ground PGD) in proportion to the amount of flowed-out charge QH; i.e., the amount of charge having flowed out to the outside as a result of the discharge of the electrified particulates SC. The magnitude of the leak current Iesc (the amount of flowed-out charge QH per unit time) approximately corresponds to the amount M of the particulates S contained in the gas under measurement EI. Accordingly, the leak current Iesc has a magnitude which corresponds to the amount M of the particulates S contained in the filtered exhaust gas FEG; i.e., the volumetric particulate amount MV (the volumetric particulate weight MVW or the volumetric particulate number MVN).

Meanwhile, the drive detection circuit section 400 applies a predetermined auxiliary voltage Vh (for example, +100 to 200 V with respect to the secondary-side ground SGD) to the auxiliary electrode pad 141 through the auxiliary voltage line 222. As a result, a DC electric field is produced between the auxiliary electrode pad 141 and the inner protector 161. Of the positive ions CP produced near the discharge electrode body 131s, floating ions CPF (positive ions) having failed to adhere to particulates S receive, from the DC electric field produced by the auxiliary electrode pad 141, repulsive forces toward the inner protector 161 on the radially outer side. As a result, the floating ions CPF adhere to various portions of the inner protector 161, which serves as a trapping electrode, whereby the floating ions CPF are collected. Thus, the floating ions CPF can be collected efficiently, and discharge of the floating ions CPF from the discharge opening 160e is prevented. The charge of the positive ions CP collected by the inner protector 161 flows, as a trapped current Itrp, from the inner protector 161 toward the secondary-side ground SGD through the return current line 223. The return current Ir flowing through the return current line 223 is the sum of the discharge current Idc and the trapped current Itrp (Ir=Idc+Itrp).

As can be understood from the above description, the return current Ir is smaller than the input current Iin by an amount corresponding to the leak current Iesc. Accordingly, the volumetric particulate amount MV (the volumetric particulate weight MVW or the volumetric particulate number MVN) of the particulates S contained in the filtered exhaust gas FEG (the gas under measurement EI) can be detected through detection of the magnitude of the leak current Iesc.

As shown in FIGS. 2, 3, and 6, the cable 200 extends from the proximal end portion 100r of the sensor 100. This cable 200 includes the discharge voltage line 221, the auxiliary voltage line 222, and the return current line 223 which are bundled together. The discharge voltage line 221, the auxiliary voltage line 222, and the return current line 223 are connected to the circuit section 300 (the drive detection circuit section 400).

The circuit section 300 is composed of the drive detection circuit section 400 and the circuit control section 500.

The circuit control section 500 has a microcomputer which includes a CPU, a ROM, and a RAM, which are not illustrated, and controls the drive detection circuit section 400. In addition, the circuit control section 500 obtains, not only the volumetric particulate weight MVW (or the volumetric particulate number MVN) of the particulates contained in the filtered exhaust gas FEG, but also a distance particulate weight MDW (or a distance particulate number MDN), etc. on the basis of the sensor output current value Ss obtained from the drive detection circuit section 400, the vehicle speed signal Vs obtained from the vehicle control section ECU, etc. The circuit control section 500 outputs the obtained values to the vehicle control section ECU (see FIG. 2).

The circuit control section 500 includes a sensor control section 510, a travel distance obtainment section 520, a flow rate obtainment section 530, a sensor current value obtainment section 540, a particulate amount computation section 550, a first integration section 560, a distance particulate amount computation section 570, a judgment section 580, and a judgment determination section 590.

In the present embodiment, the volumetric particulate weight MVW, the integral volumetric particulate weight SMVW, and the distance particulate weight MDW of the particulates contained in the filtered exhaust gas FEG are obtained in the circuit section 300 (the circuit control section 500). However, the embodiment may be modified such that a volumetric particulate number MVN is obtained as a volumetric particulate amount MV of the particulates contained in the filtered exhaust gas FEG, an integral volumetric particulate number SMVN is obtained therefrom as an integral volumetric particulate amount SMD, and a distance particulate number MDN is obtained as a distance particulate amount MD.

The drive detection circuit section 400 (see FIG. 6) includes a primary-side power supply circuit 710, an isolation transformer 720, a first rectification circuit 751, and a second rectification circuit 752 which generate various voltages for driving the sensor 100. In addition thereto, the drive detection circuit section 400 includes a discharge current measurement circuit 730 and a sensor current measurement circuit 740 which obtain signals from the sensor 100. As indicated by a broken line in FIG. 6, these circuits are divided to a primary-side circuit in which the primary-side ground PGD is used as a reference potential and a secondary-side circuit in which the secondary-side ground SGD is used as a reference potential. The primary-side ground PGD and the secondary-side ground SGD are isolated from each other.

The primary-side power supply circuit 710 applies the DC voltage supplied from the power supply section BT to the isolation transformer 720. The primary-side power supply circuit 710 includes a discharge voltage control circuit 711 and a transformer drive circuit 712. The discharge voltage control circuit 711 includes a DC-DC converter and can change the voltage supplied to the isolation transformer 720 under the control by the sensor control section 510 of the circuit control section 500. For example, the circuit control section 500 controls the discharge voltage control circuit 711 such that the current value of the input current Iin supplied to the discharge electrode body 131s of the ceramic element 120 through the discharge voltage line 221 becomes equal to a target input current value (for example, 5 µA). As a result, the amount of positive ions CP generated by means of corona discharge between the distal end portion 131ss of the discharge electrode body 131s and the protector 160 within the sensor 100 can be made constant.

Meanwhile, the transformer drive circuit 712 includes a switch circuit capable of switching the direction of the current flowing from the primary-side power supply circuit 710 to the primary coil of the isolation transformer 720 between forward and reverse directions, and drives the isolation transformer 720 by the switching operation of the switch circuit.

The isolation transformer 720 is configured such that the primary coil and the secondary coil are magnetically coupled with each other but are electrically isolated from each other. In cooperation with the primary-side power supply circuit 710 and the transformer drive circuit 712, the isolation transformer 720 performs voltage conversion for the electric power supplied from the primary side, and supplies the voltage-converted AC electric power to the two rectification circuits 751 and 752 on the secondary side. In the isolation transformer 720, the voltage supplied to the first rectification circuit 751 and the voltage supplied to the second rectification circuit 752 are set by the ratio between the number of turns of the primary coil and the number of turns of the secondary coil. An end portion of the primary coil of the isolation transformer 720 is connected to the primary-side ground PGD, and an end portion of the secondary coil of the isolation transformer 720 is connected to the secondary-side ground SGD. Notably, the primary-side ground PGD electrically communicates with the body of the vehicle AM and has the same potential as the so-called chassis ground. Namely, each of the exhaust pipe EP, the boss BO, and the casing 100C of the sensor 100 coupled with the boss BO is maintained at the potential of the primary-side ground PGD. Meanwhile, the protector 160 of the sensor 100 is connected to the secondary-side ground SGD through the return current line 223 and the current detection resistor 230.

Each of the two rectification circuits 751 and 752 converts the AC electric power output from the isolation transformer 720 to DC electric power. The first rectification circuit 751 applies the discharge voltage Vdc to the discharge wiring conductor 130 of the ceramic element 120 through a short protection resistor 753 and the discharge voltage line 221 so that the input current Iin flows to the discharge wiring conductor 130. The second rectification circuit 752 applies the auxiliary voltage Vh to the auxiliary electrode wiring conductor 140 of the ceramic element 120 through a short protection resistor 754 and the auxiliary voltage line 222.

Meanwhile, the discharge current measurement circuit 730 is a circuit extending between the primary and secondary sides of the isolation transformer 720. The discharge current measurement circuit 730 is connected to the opposite ends of the current detection resistor 230 through input wiring lines 761 and 762, and is connected to the circuit control section 500 through an output wiring line 763. The discharge current measurement circuit 730 detects the return current Ir (=Idc+Itrp) flowing toward the secondary-side ground SGD through the return current line 223 and outputs a return current value Sr representing the return current Ir to the circuit control section 500. The "return current value Sr" is not limited to a digital signal obtained through mere AD conversion of the value of the return current Ir, and a signal indirectly representing the value of the return current Ir may be used. For example, in the case where the value of the return current Ir can be specified by calculating the value by applying a predetermined computation expression to the numerical value or information represented by the "return current value Sr" or converting the numerical value or information represented by the "return current value Sr" through use of a lookup table, such a signal may be used as the "return current value Sr."

Notably, the leak current Iesc is equal to or less than $1/10^5$ of the input current Iin although it depends on the amount of the particulates contained in the filtered exhaust gas FEG. Therefore, the return current Ir is approximately equal to the input current Iin (Ir≅Iin).

In view of this, in the present embodiment, the circuit control section 500 controls the magnitude of the input current Iin through the control of the discharge voltage control circuit 711 while ignoring the leak current Iesc and assuming that the return current Ir is equal to the input current Iin (Ir=Iin). Specifically, the circuit control section 500 controls the magnitude of the input current Iin such that the return current value Sr which represents the return current Ir (=Iin) obtained by the discharge current measurement circuit 730 becomes equal to the target input current value (for example, 5 μA).

The sensor current measurement circuit 740 is also a circuit extending between the primary and secondary sides of the isolation transformer 720. The sensor current measurement circuit 740 measures a sensor output current Is which corresponds to the leak current Iesc stemming from discharged ions CPH which are ions having flowed out to the outside without being collected by the protector 160. The sensor current measurement circuit 740 is connected to the secondary-side ground SGD through a connection wiring line 771 and is connected to the primary-side ground PGD through a connection wiring line 775. Also, the sensor current measurement circuit 740 outputs the sensor output current value Ss to the circuit control section 500 through an output wiring line 773.

As described above, a relation represented by the following expression (a) holds among the currents flowing through the distal end portion 100e of the sensor 100.

$$Iin=Idc+Itrp+Iesc=Ir+Iesc \qquad (a)$$

In expression (a), Iin represents the input current flowing to the discharge electrode body 131s, and Idc represents the discharge current flowing from the discharge electrode body 131s to the protector 160 (the inner protector 161). Also, Itrp represents the trapped current which corresponds to the charge carried by the floating ions CPF having adhered to the protector 160 (the inner protector 161) and collected thereby and which flows to the protector 160 (the inner protector 161). Iesc represents the leak current which corresponds to the amount of flowed-out charge QH of the discharged ions CPH which are ions having adhered to the particulates S without being collected by the protector 160 and flowed out to the outside as the electrified particulates SC. Ir represents the return current which flows toward the secondary-side ground SGD through the return current line 223 and the current detection resistor 230, and Ir=Idc+Itrp.

When viewed from the secondary-side ground SGD, the current returning as the return current Ir is smaller than the current output as the input current Iin by an amount corresponding to the leak current Iesc. Accordingly, when the leak current Iesc flows, the reference potential of the secondary-side ground SGD becomes lower than the reference potential of the primary-side ground PGD in accordance with the magnitude of the leak current Iesc. Therefore, when the primary-side ground PGD and the secondary-side ground SGD are connected together, the sensor output current Is which compensates for the leak current Iesc flows from the primary-side ground PGD toward the secondary-side ground SGD. The sensor output current Is flows in an amount corresponding to the leak current Iesc which corresponds to the amount of flowed-out charge QH of the discharged ions CPH which have flowed out to the outside of the protector 160 as the electrified particulates SC. This sensor output current Is has a magnitude which corresponds, in real time, to the volumetric particulate amount MV (the volumetric particulate weight MVW or the volumetric particulate number MVN) of the particulates S contained in the filtered exhaust gas FEG flowing through the exhaust pipe EP.

In view of this, the sensor current measurement circuit 740 of the present embodiment detects the sensor output current Is flowing between the primary-side ground PGD and the secondary-side ground SGD. Specifically, the sensor current measurement circuit 740 performs I-V conversion for the sensor output current Is, converts the resultant voltage value corresponding to the sensor output current Is to the sensor output current value (digital value) Ss representing the magnitude of the sensor output current Is, through AD conversion, and outputs the sensor output current value Ss to the circuit control section 500. Notably, in the present embodiment, the sampling interval Ts of the sensor output current value Ss is set to 0.1 sec. Accordingly, in the present embodiment, the sensor output current value Ss which corresponds to the volumetric particulate amount MV (the volumetric particulate weight MVW or the volumetric particulate number MVN) of the particulates S contained in the filtered exhaust gas FEG can be obtained every time the sampling interval Ts (=0.1 sec) elapses.

The sensor current value obtainment section 540 of the circuit control section 500 obtains the signal input from the sensor current measurement circuit 740 and representing the sensor output current value Ss. The particulate amount computation section 550 computes the volumetric particulate weight MVW (or the volumetric particulate number MVN) of the particulates S contained in the filtered exhaust gas FEG. Subsequently, the circuit control section 500 outputs the calculated volumetric particulate weight MVW (or the calculated volumetric particulate number MVN) of the particulates S to the vehicle control section ECU. The "sensor output current value Ss" is not limited to a digital signal obtained through mere AD conversion of the value of the sensor output current Is, and a signal indirectly representing the value of the sensor output current Is may be used. For example, in the case where the value of the sensor output current Is can be specified by calculating the value by applying a predetermined computation expression to the numerical value or information represented by the "sensor output current value Ss" or converting the numerical value or information represented by the "sensor output current value Ss" through use of a lookup table, such a signal can be used as the "sensor output current value Ss."

Thus, in real time, the particulate detection system 10 (the sensor 100, the cable 200, and the circuit section 300) of the present embodiment can inform, in real time, the vehicle control section ECU of the detected volumetric particulate weight MVW (or the detected volumetric particulate number MVN) of the particulates S contained in the filtered exhaust gas FEG. Therefore, in the vehicle control section ECU, the volumetric particulate weight MVW (or the volumetric particulate number MVN) can be utilized immediately for control of the vehicle AM and the engine ENG (see FIG. 2).

Moreover, in the particulate detection system 10 of the present embodiment, in addition to the above-described volumetric particulate weight MVW (or the volumetric particulate number MVN), the distance particulate weight MDW (or the distance particulate number MDN) is computed by using the flow rate Fd of the exhaust gas EG and total travel distances Dd1 and Dd2 of the vehicle AM, which are obtained from the external vehicle control section ECU, as well as the sensor output current value Ss obtained from the sensor 100. Also, the judgment as to whether or not the filter DPF is broken is made by using the distance particulate weight MDW (or the distance particulate number MDN), and the judgment result DT is reported to the vehicle control section ECU.

On the basis of the reported judgment result DT or on the basis of the reported judgment result DT and the distance particulate weight MDW (or the distance particulate number MDN), the vehicle control section ECU turns on the display provided on the unillustrated dashboard of the vehicle AM so as to warn the breakage of the filter DPF.

The computation of the distance particulate weight MDW (or the distance particulate number MDN) and the judgment of the characteristics of the filter DPF will now be described (see FIG. 7). In the particulate detection system 10 of the present embodiment, when the CPU of the circuit section 300 (the circuit control section 500) starts upon startup of the vehicle AM, after performing initial setting in step S1, in step S2, the circuit control section 500 waits for the start of a detection period SP. In the present embodiment, the detection period SP is a period between a point when the vehicle AM starts its travel and a point when the vehicle stops. The circuit control section 500 receives the vehicle speed signal Vs of the vehicle AM from the external vehicle control section ECU and detects the start of the travel of the vehicle AM. In the case where the vehicle AM has started its travel (Yes; the vehicle speed signal Vs≠0), the circuit control section 500 judges that the detection period SP has started and proceeds to step S3.

In step S3, the circuit control section 500 obtains the first total travel distance Dd1 from the vehicle control section ECU. The first total travel distance Dd1 is the total travel distance at that point in time (the point in time when the vehicle AM starts its travel), which is computed by the vehicle control section ECU. The circuit control section 500 which executes the processing in this step S3 and the processing in step S11 which will be described later corresponds to the travel distance obtainment section 520. Notably, the vehicle control section ECU always computes the total travel distance after the vehicle AM was manufactured by, for example, detecting the number of rotations of the wheels on the basis of an output signal from an axle rotation sensor (not shown) attached to the axle of the vehicle AM.

Subsequently, in step S4, the circuit control section 500 obtains, from the vehicle control section ECU, the flow rate Fd of the exhaust gas EG flowing through the exhaust pipe EP at that point in time. The circuit control section 500 which executes the processing in this step S4 and the processing in step S8 which will be described later corresponds to the flow rate obtainment section 530. Notably, the vehicle control section ECU of the present embodiment always detects the flow rate Fd of the exhaust gas EG from the output signal from the flow rate sensor FS attached to the exhaust pipe EP. Notably, the vehicle control section ECU may obtain the flow rate Fd of the exhaust gas EG through estimation without using flow rate sensor FS. Specifically, the circuit control section 500 may obtain from the vehicle control section ECU the flow rate Fd of the exhaust gas EG estimated from the amount of inflow air, the fuel injection amount, etc.

Furthermore, in step S5, the circuit control section 500 obtains the sensor output current value Ss at that point in time. The circuit control section 500 which executes the processing in this step S5 corresponds to the sensor current value obtainment section 540.

In step S6 subsequent thereto, the circuit control section 500 computes a real-time volumetric particulate weight MVW (unit: mg/m$^3$) of the filtered exhaust gas FEG at that point in time from the sensor output current value Ss obtained in step S5, and sends the real-time volumetric particulate weight MVW to the vehicle control section ECU. The circuit control section 500 which executes the processing in this step S6 corresponds to the particulate amount computation section 550. Notably, a volumetric particulate number MVN (unit: pcs/m$^3$) may be computed from the sensor output current value Ss and be sent to the vehicle control section ECU as a volumetric particulate amount MV.

Furthermore, in step S7, the circuit control section 500 computes an integral volumetric particulate weight SMVW (or an integral volumetric particulate number SMVN) by integrating the obtained volumetric particulate weight MVW (or the obtained volumetric particulate number MVN). Specifically, the circuit control section 500 obtains a new integral volumetric particulate weight SMVW by adding the volumetric particulate weight MVW newly obtained to the already obtained integral volumetric particulate weight SMVW (SMVW=SMVW+MVW). Notably, in the case where the integral volumetric particulate number SMVN is computed through use of the volumetric particulate number MVN, the integral volumetric particulate number SMVN is computed in a similar manner (SMVN=SMVN+MVN). The circuit control section 500 which executes the processing in this step S7 corresponds to the first integration section 560.

Subsequently, in step S8, the circuit control section 500 computes an integral flow rate SFd (m$^3$) by integrating the flow rate Fd of the exhaust gas EG obtained from the vehicle control section ECU in step S4. Specifically, the circuit control section 500 obtains a new integral flow rate SFd by adding the flow rate Fd newly obtained to the already obtained integral flow rate SFd (SFd=SFd+Fd). As described above, the circuit control section 500 which executes the processing in step S4 and the processing in step S8 corresponds to the flow rate obtainment section 530.

In step S9, the circuit control section 500 judges whether or not the detection period SP has ended. As described above, in the present embodiment, the detection period SP is a period between the point when the vehicle AM starts its travel and the point when the vehicle stops. Therefore, the circuit control section 500 determines whether or not the vehicle AM has stopped on the basis of the vehicle speed signal Vs of the vehicle AM received from the external vehicle control section ECU. In the case where the vehicle AM has not yet stopped (is traveling) (No), the circuit control section 500 proceeds to step S10.

The sensor output current value Ss is obtained every time the sampling interval Ts (in the present embodiment, Ts=0.1 sec as described above) elapses. Therefore, in step S10, the circuit control section 500 waits for the elapse of the sampling interval Ts. After elapse of the sampling interval Ts (in the case of Yes), the circuit control section 500 returns to step S4, and again repeats the processing in steps S4 to S8, such as obtainment of the sensor output current value Ss (step S5). As a result, until the detection period SP ends (Yes in step S9), the circuit control section 500 continuously computes the integral volumetric particulate weight SMVW (mg/m$^3$) or the integral volumetric particulate number SMVN (pcs/m$^3$) from the sensor output current value Ss after the start of the detection period SP, every time the sampling interval Ts elapses. Also, the circuit control section 500 continuously computes the integral flow rate SFd from the flow rate Fd.

Meanwhile, in the case where it is judged in step S9 that the detection period ends (Yes) due to stoppage of the vehicle AM (the vehicle speed signal Vs=0), the circuit control section 500 proceeds to step S11.

In step S11, the circuit control section 500 obtains the second total travel distance Dd2 in the same manner as in step S3. The second total travel distance Dd2 is the total travel distance at that point in time (the point in time when the vehicle AM has stopped), which is computed by the vehicle control section ECU at that point in time. The circuit control section 500 then computes a period travel distance Dd (km) during the detection period SP by subtracting the first total travel distance Dd1 from the second total travel distance Dd2 (Dd=Dd2−Dd1). As described above, the circuit control section 500 which executes the processing in step S3 and the processing in step S11 corresponds to the travel distance obtainment section 520.

Next, in step S12, the circuit control section 500 computes a distance particulate weight MDW (mg/km) in the detection period SP. Specifically, the circuit control section 500 computes the distance particulate weight MDW by using the integral volumetric particulate weight SMVW based on the sensor output current value Ss, the period travel distance Dd of the vehicle AM in the detection period SP, and the integral flow rate SFd of the exhaust gas EG in the detection period SP (MDW=SMVW·SFd/Dd). As a result, the distance particulate amount MD during the travel of the vehicle AM in the detection period SP from the start of travel (starting) of the vehicle AM to the stoppage of the vehicle AM is obtained. The circuit control section 500 which executes the processing in step S12 corresponds to the distance particulate amount computation section (the first computation section) 570.

Notably, in the case where the distance particulate number MDN (pcs/km) in the detection period SP is computed, the distance particulate number MDN is computed through use of a similar equation (MDN=SMVN·SFd/Dd).

Next, in step S13, the circuit control section 500 determines whether or not the magnitude of the obtained distance particulate weight MDW (or the obtained distance particulate number MDN) is proper. In the case where the filter DPF is normal, the amount of the particulates in the filtered exhaust gas FEG is slight. However, in the case where the filter DPF is broken (due to, for example, cracking), a portion of the unfiltered exhaust gas EG may mix with the filtered exhaust gas FEG. In order to detect such mixing, in step S13, the circuit control section 500 compares the obtained distance particulate weight MDW with a judgment threshold value THW. In the case where MDW≤THW, the circuit control section 500 judges that the filter DPF is normal (OK). Meanwhile, in the case where MDW>THW, the circuit control section 500 judges that the filter DPF is broken (NG). The circuit control section 500 which executes the processing in step S13 corresponds to the judgment section 580. Notably, in the case where the distance particulate number MDN is used, similarly, the circuit control section 500 compares the distance particulate number MDN with a judgment threshold value THN, and judges that the filter DPF is NG when MDN>THN.

In the case where the circuit control section 500 judges in step S14 that the result of the judgment in step S13 is "OK" (No), the circuit control section 500 proceeds to step S2 and waits for the start of a new detection period SP. Meanwhile, in the case where the circuit control section 500 makes a "Yes" judgment in step S14; i.e., the result of the judgment in step S13 is "NG," the circuit control section 500 proceeds to step S15.

In step S15, the circuit control section 500 increases, by one, an NG detection number of times N which represents the number of times of the NG judgment (N=N+1).

In step S16 subsequent thereto, the circuit control section 500 judges whether or not the NG detection number of times N is equal to or greater than a predetermined number of times (in the present embodiment, 5 times). In the case where the circuit control section 500 makes a "No" judgment in step S16; i.e., the NG detection number of times N has not yet reached the predetermined number of times, the circuit control section 500 returns to step S2 and waits for the start of a new detection period SP. Meanwhile, in the case where the circuit control section 500 makes a "Yes" judgment in step S16; i.e., the NG detection number of times N has reached the predetermined number of times (in the present embodiment, 5 times), the circuit control section 500 proceeds to step S17.

In step S17, as a comprehensive judgment, the circuit control section 500 determines that the particulate collection characteristics of the filter DPF have deteriorated and sends to the external vehicle control section ECU an NG notification signal DT representing that the particulate collection characteristics of the filter DPF have deteriorated. In response thereto, the vehicle control section ECU turns on the warning display for a driver, which display is provided at a specific position within the dashboard (not shown). The circuit control section 500 which executes the processing in these steps S15 to S17 corresponds to the judgment determination section 590.

As described above, this particulate detection system 10 not only measures the volumetric particulate weight MVW (or the volumetric particulate number MVN) of particulates contained in the filtered exhaust gas FEG, but also computes the distance particulate weight MDW (or the distance particulate number MDN) on the basis of the sensor output current value Ss, the period travel distance Dd of the vehicle AM, and the flow rate Fd of the exhaust gas EG. Therefore, the distance particulate weight MDW (or the distance particulate number MDN) for the judgment as to whether the particulate collection characteristics of the filter DPF are normal or anomalous can be obtained easily. Also, through use of the distance particulate weight MDW, a deterioration in the particulate collection characteristics of the filter DPF can be easily detected.

In this particulate detection system 10, the integral volumetric particulate weight SMVW (or the integral volumetric particulate number SMVN) over the detection period SP is obtained in step S7 (the first integration section 560), and then, the distance particulate weight MDW (or the distance particulate number MDN) is computed in the distance particulate amount computation section (the first computation section) 570 on the basis of the integral volumetric particulate weight SMVW, the period travel distance Dd (the total travel distances Dd1 and Dd2), and the flow rate Fd (the integral flow rate SFd). Therefore, the distance particulate weight MDW (the distance particulate number MDN) averaged in the detection period SP can be computed easily.

Also, in this system 10, since the circuit control section (the computation section) 500 includes the travel distance obtainment section 520 and the flow rate obtainment section 530, the distance particulate weight MDW (or the distance particulate number MDN) in the detection period SP can be computed more easily.

Since this particulate detection system 10 includes the judgment section 580 for judging whether the particulate collection characteristics of the filter DPF are normal or anomalous by using the computed distance particulate weight MDW (or the computed distance particulate number MDN), the judgment as to whether the filter DPF is normal or anomalous can be made appropriately by using the sensor output current value Ss of the sensor 100.

In addition, in this particulate detection system 10, the judgment determination section 590 of the circuit control section 500 finally determines that the filter DPF is anomalous in the case where the pattern of appearance of the judgment made in the judgment section 580 and indicating presence of an anomaly satisfies a predetermined judgment condition (in the present embodiment, in the case where the judgment condition that the NG judgment occurs five times is satisfied). Therefore, the judgment as to whether the filter DPF is normal or anomalous can be made more reliably.

Notably, in the particulate detection system 10 of the present embodiment, since the detection period SP is a period between the start of travel of the vehicle AM and the stoppage of the vehicle AM, the length of the detection period SP is variable.

However, the detection period SP may be each time period after the startup of the vehicle AM, which has a predetermined time length (for example, 10 minutes). In this case, it is preferred that the detection period SP is clocked while an idling period during which the vehicle AM is stopped and an FC period during which fuel cut is performed are excluded, and the distance particulate weight MDW is computed without performing the computation of the integral volumetric particulate weight SMVW and the computation of the integral flow rate SFd and the period travel distance Dd during the idling period and the FC period. Alternatively, the idling period and the FC period may be included in the detection period SP. In this case, when the ratio of the idling period and the FC period to the detection period SP exceeds a predetermined value (for example, 50%), the computation of the distance particulate weight MDW for that detection period SP is stopped.

In the particulate detection system 10 of the present embodiment, the flow rate Fd at each point in time is obtained from the vehicle control section ECU provided externally of the system 10. However, the system 10 may be modified such that the flow rate obtainment section 530 (step S4) of the circuit control section 500 directly obtains the data of the flow rate Fd, which is the output of the flow rate sensor FS, and computes the integral flow rate SFd in the detection period SP.

In the particulate detection system 10 of the present embodiment, the first total travel distance Dd1 at the start of the detection period SP and the second total travel distance Dd2 at the end of the detection period SP are obtained from the vehicle control section ECU provided externally of the system 10, and the period travel distance Dd in the detection period SP is computed therefrom. However, the system 10 may be modified such that the travel distance obtainment section 520 directly obtains the output of a rotation sensor for measuring the rotation of an unillustrated axle over the detection period SP, and computes the period travel distance Dd in the detection period SP therefrom.

In the particulate detection system 10 of the present embodiment, the comprehensive judgment as to whether the characteristics of the filter DPF have deteriorated is made (step S17) by judging whether or not the detection period SP in which the magnitude of the distance particulate weight MDW has exceeded the judgment threshold value THW was observed 5 times or more (N≤5) (step S16). However, the conditions for the comprehensive judgment may be modified such that the filter DPF is comprehensively judged that its characteristics have deteriorated in the case where the detection period SP in which the magnitude of the distance particulate weight MDW has exceeded the judgment threshold value THW was observed a predetermined number of times continuously.

(First Modification)

Next, a particulate detection system 1010 according to a first modification which differs slightly from the particulate detection system 10 of the above-described embodiment will be described with reference to FIGS. 8 to 10. In the particulate detection system 10 of the above-described embodiment, the external vehicle control section ECU is not a portion of the particulate detection system 10. Therefore, in the circuit control section 500 of the circuit section 300, whereas the sensor current value obtainment section 540 obtains the sensor output current value Ss and the particulate amount computation section 550 computes the volumetric particulate weight MVW, the flow rate obtainment section 530 obtains the flow rate Fd of the exhaust gas EG from the vehicle control section ECU (provided externally of the present system), the travel distance obtainment section 520 obtains the total travel distances Dd1 and Dd2 from the vehicle control section ECU, and the distance particulate amount computation section 570 computes the distance particulate weight MDW.

Figure 8:
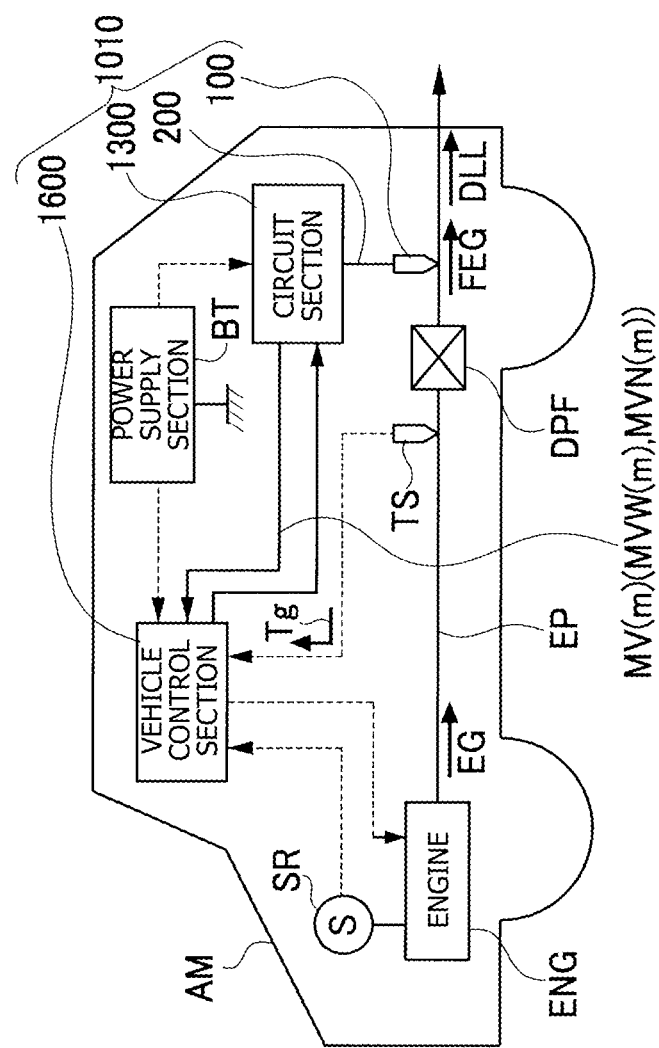
FIG. 8 shows the first modification and is an explanatory view used for describing the configuration of a vehicle in which the particulate detection system is applied to an exhaust pipe of an engine.
Figure 9:
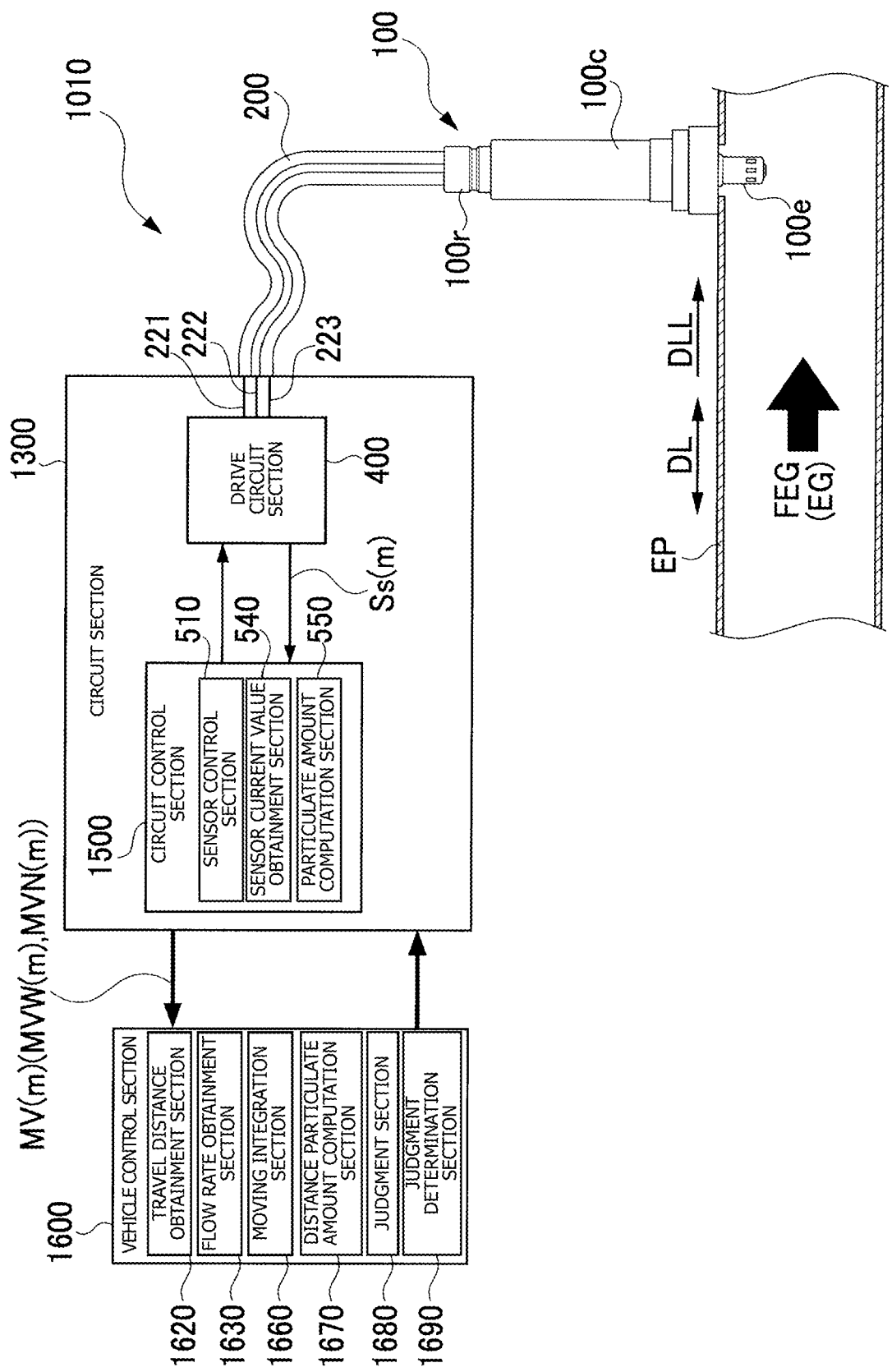
FIG. 9 shows the first modification and is an explanatory view of the particulate detection system whose sensor is attached to the exhaust pipe.
Figure 10:
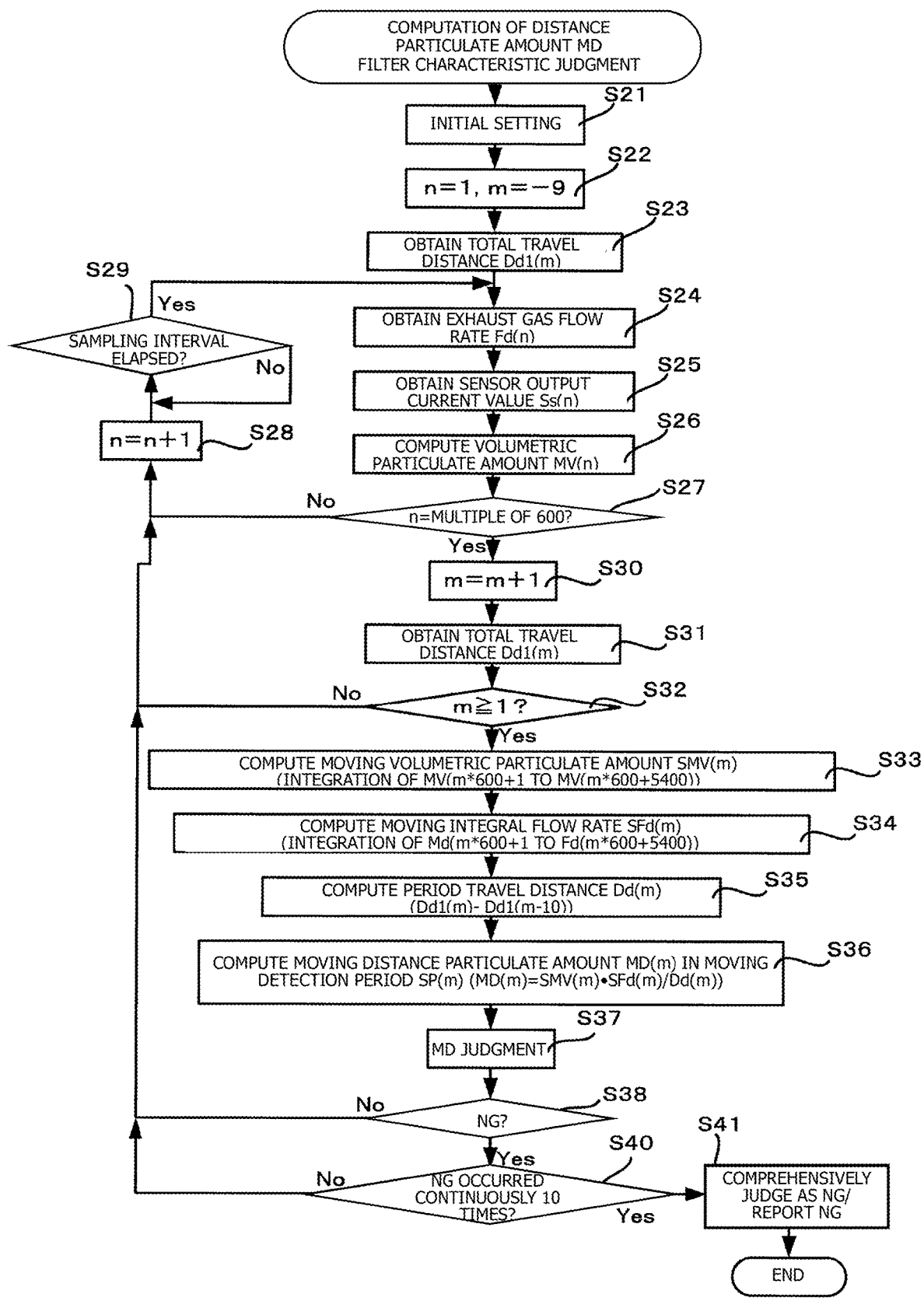
FIG. 10 shows the first modification and is a flowchart showing the steps for computation of the distance particulate amount MD (the distance particulate weight MDW or the distance particulate number MDN) and judgment of the characteristics of the filter DPF.

The particulate detection system 1010 of the present first modification differs from the particulate detection system 10 of the embodiment in the point that in addition to the sensor 100, the cable 200, and a circuit section 1300, a vehicle control section 1600 is contained in the particulate detection system 1010, and the processing for computing the distance particulate amount MD is divided between a circuit control section 1500 of the circuit section 1300 and the vehicle control section 1600 (see FIGS. 8 and 9).

In the above-described embodiment, a period between the point when the vehicle AM starts its travel (the start of travel) and the point when the vehicle stops (the stoppage of the vehicle), which period has a variable length, is used as a single detection period SP, and the distance particulate amount MD in this detection period SP is computed.

In contrast, in the system 1010 of the present first modification, moving detection periods SP(m) are employed. Each of the moving detection periods SP(m) is a detection period which has a fixed length and the start of which is shifted by a predetermined moving period from the start of the previous moving detection period SP(m). Therefore, every time the moving period elapses, the end of each moving detection period SP(m) comes, and the distance particulate amount MD is computed. The particulate detection system 1010 of the present first modification differs from the particulate detection system 10 of the embodiment in the point that the above-mentioned moving detection periods SP(m) are employed.

Therefore, in the below, portions of the particulate detection system 1010 of the present first modification which differ from those of the particulate detection system 10 of the embodiment will be mainly described, and the description of portions of the particulate detection system 1010 identical with those of the particulate detection system 10 will be omitted or simplified.

In the vehicle AM according to the present first modification, there is mounted the particulate detection system 1010 which includes not only the sensor 100, the circuit section 1300, and the cable 200 for establishing the electrical connection therebetween, but also the vehicle control section 1600 which is communicatably connected to the circuit section 1300 (see FIG. 8). Since the sensor 100, the cable 200, and the drive detection circuit section 400 of the circuit section 1300 are identical with those in the embodiment, their descriptions will not be repeated. The circuit section 1300 includes the circuit control section 1500 which controls the drive detection circuit section 400, obtains the sensor output current value Ss, computes volumetric particulate weights MVW(m), and successively outputs them to the vehicle control section 1600 (see FIG. 9). Like the circuit control section 500 of the embodiment, the circuit control section 1500 is a microcomputer including a CPU, a ROM, a RAM, etc., and operates in accordance with a predetermined control program.

As in the case of the embodiment, the sensor control section 510 of the circuit control section 1500 controls the drive detection circuit section 400. The sensor current value obtainment section 540 of the circuit control section 1500 obtains, at intervals of the sampling interval Ts (=0.1 sec), the signal input from the sensor current measurement circuit 740 and representing the sensor output current value Ss(n). The particulate amount computation section 550 of the circuit control section 1500 computes, in real time, the volumetric particulate weight MVW(n) (or the volumetric particulate number MVN(n)) of the particulates S contained in the filtered exhaust gas FEG. Subsequently, the circuit control section 1500 sends the volumetric particulate weight MVW(n) (or the volumetric particulate number MVN(n)) to the vehicle control section 1600.

Meanwhile, the vehicle control section 1600 corresponds to the external vehicle control section ECU in the embodiment. As in the case of the vehicle control section ECU, the vehicle control section 1600 is driven by the power supply section BT, and controls the engine ENG by using the outputs of various types of sensors SR, such as a rotational speed sensor, attached to the engine ENG, etc. The vehicle control section 1600 is also a microcomputer including a CPU, a ROM, a RAM, etc., and operates in accordance with a predetermined control program. In the present first modification, instead of the circuit control section 500, the vehicle control section 1600 realizes a travel distance obtainment section 1620, a flow rate obtainment section 1630, a moving integration section (first integration section) 1660, a distance particulate amount computation section 1670, a judgment section 1680, and a judgment determination section 1690.

In the present first modification, the circuit section 1300 (the circuit control section 1500) obtains the volumetric particulate weight MVW(n) of the particulates of the filtered exhaust gas FEG, a moving volumetric particulate weight SMVW(m), and a moving distance particulate weight MDW(m). However, the circuit section 1300 (the circuit control section 1500) may obtain a volumetric particulate number MDN(n) as a volumetric particulate amount MV(n) of the particulates of the filtered exhaust gas FEG, obtain a moving volumetric particulate number SMVN(m) therefrom as a moving volumetric particulate amount SMV(m), and obtain a moving distance particulate number MDN(m) as a distance particulate amount MD(m).

Next, the computation of the moving distance particulate weight MDW(m) (or the moving distance particulate number MDN(m)) and the judgment of the characteristics of the filter DPF in the system 1010 of the present first modification will be described. First, when the CPU of the circuit section 1300 (the circuit control section 1500) starts upon startup of the vehicle AM, after performing initial setting in step S21, in step S22, the values of two variables n and m are set to 1 and −9 (their initial values), respectively (i.e., n=1, m=−9).

In step S23, the vehicle control section 1600 obtains a first total travel distance Dd1(m) which is computed by the vehicle control section 1600 by itself and is the total travel distance at that point in time. Notably, as in the case of the vehicle control section ECU of the embodiment, the vehicle control section 1600 always computes the total travel distance after the vehicle AM was manufactured.

Next, in step S24, the vehicle control section 1600 obtains the flow rate Fd(n) of the exhaust gas EG flowing through the exhaust pipe EP at that point in time. The vehicle control section 1600 which executes the processing in this step S24 and the processing in step S34 which will be described later corresponds to the flow rate obtainment section 1630.

Furthermore, in step S25, the circuit control section 1500 obtains the sensor output current value Ss(n) at that point in time. The circuit control section 1500 which executes the processing in this step S25 corresponds to the sensor current value obtainment section 540.

In step S26 subsequent thereto, the circuit control section 1500 computes a volumetric particulate weight MVW(n) (unit: mg/m$^3$) of the filtered exhaust gas FEG at that point in time from the sensor output current value Ss(n) obtained in step S25, and sends the volumetric particulate weight MVW (n) to the vehicle control section 1600. The circuit control section 1500 which executes the processing in this step S26 corresponds to the particulate amount computation section 550. Notably, a volumetric particulate number MVN(n) (unit: pcs/m$^3$) may be computed from the sensor output current value Ss(n) and be sent to the vehicle control section 1600 as a volumetric particulate amount MV(n).

In step S27, the vehicle control section 1600 judges whether or not the value of the variable n is a multiple of 600. In the case where the result of judgment is "No"; i.e., the value of the variable n is not a multiple of 600, the vehicle control section 1600 proceeds to step S28 and increments the value of the variable n. Further, the vehicle control section 1600 proceeds to step S29 so as to wait for elapse of the sampling interval Ts (Ts=0.1 sec) and returns to step S24. Meanwhile, in the case where the result of the judgment in step S27 is "Yes"; i.e., the value of the variable n is a multiple of 600, the vehicle control section 1600 proceeds to step S30 so as to increment the value of the variable m and then proceeds to step S31.

As can be understood from this description, every time the sampling interval Ts elapses, the vehicle control section 1600 obtains the sensor output current value Ss(n), the flow rate Fd(n), and the volumetric particulate weight MVW(n) (or the volumetric particulate number MVN(n)); and every time the flow rate Fd(n), and the volumetric particulate weight MVW(n) (or the volumetric particulate number MVN(n)) are obtained 600 times (every time 60 seconds elapses), the vehicle control section 1600 increments the value of the variable m, and proceeds to step S31.

In step S31, the first total travel distance Dd1 (*m*) which is computed by the vehicle control section 1600 and is the total travel distance at that point in time is obtained as in step S23.

Subsequently, the vehicle control section 1600 proceeds to step S32 so as to judge whether or not the value of the variable m is equal to or greater than 1. In the case where the result of the judgment is "No" (m≤0), the circuit control section 1500 returns to step S24 via steps S28 and S29. Meanwhile, in the case where the result of the judgment in step S32 is "Yes" (namely, m≥1), the vehicle control section 1600 proceeds to step S33.

Notably, since the value of the variable m is set to −9 (its initial value) in step S22, in the case where 6000 sensor output current values Ss(n), 6000 flow rates Fd(n), and 6000 volumetric particulate weights MVW(n) have been obtained until the value of the variable n reaches 6000; i.e., over 600 seconds (−10 minutes), after that point in time, the vehicle control section 1600 proceeds to step S33 every time one minute elapses.

In step S33, the vehicle control section 1600 integrates the obtained volumetric particulate weights MVW(m*600+1) to MVW(m*600+5400) to thereby compute a moving volumetric particulate weight SMVW(m) in a moving detection period SP(m) (SMVW(m)=MVW(m*600+1)+ . . . +MVW(m*600+5400)). Notably, in the case where a moving volumetric particulate number SMVN(m) is computed through use of the volumetric particulate number MVN(n), the moving volumetric particulate number SMVN(m) is computed in a manner similar to that for the moving volumetric particulate weight SMVW(m) (SMVN(m)=MVN(m*600+1)+ . . . +MVN(m*600+5400)). The vehicle control section 1600 which executes the processing in this step S33 corresponds to the moving integration section 1660.

Furthermore, in step S34, the vehicle control section 1600 integrates the obtained flow rates Fd(m*600+1) to Fd(m*600+5400) to thereby compute a moving integral flow rate SFd(m) in the moving detection period SP(m) (SFd(m)=Fd(m*600+1)+ . . . +Fd(m*600+5400)). As described above, the vehicle control section 1600 which executes the processing in steps S24 and S34 corresponds to the flow rate obtainment section 1630.

Furthermore, in step S35, the vehicle control section 1600 subtracts the total travel distance Dd1(*m*−10) from the total travel distance Dd1(*m*), thereby computing a period travel distance Dd(m) of the vehicle AM in the moving detection period SP(m) (Dd(m)=Dd1(*m*)−Dd1(*m*−10)). The vehicle control section 1600 which executes the processing in these steps S23, S31, and S35 corresponds to the travel distance obtainment section 1620.

Furthermore, in step S36, the vehicle control section 1600 computes a moving distance particulate weight MDW(m) in the moving detection period SP(m). Specifically, the vehicle control section 1600 computes a moving distance particulate weight MDW(m) (unit: mg/km) through use of the moving volumetric particulate weight SMVW(m), the period travel distance Dd(m), and the moving integral flow rate SFd(m) in the moving detection period SP(m) (MDW(m)= SMVW(m)·SFd(m)/Dd(m)). As a result, while the vehicle AM is traveling, the moving distance particulate weights MDW(m) in the moving detection periods SP(m) each of which has a length of 10 minutes and starts with a shift of one minute (the moving period MP) from the start of the previous moving detection period SP(m). The vehicle control section 1600 which executes the processing in this step S36 corresponds to the distance particulate amount computation section (the first moving computation section) 1670.

Notably, in the case where the moving distance particulate number MDN(m) in the corresponding moving detection period SP(m) is computed through use of the moving volumetric particulate number SMVN(m), the moving distance particulate number MDN(m) is computed through use of an equation similar to that used for computation of the moving distance particulate weight MDW(m) (MDN(m)=SMVN(m)·SFd(m)/Dd(m)).

Next, in step S37, the vehicle control section 1600 judges whether or not the magnitude of the obtained moving distance particulate weight MDW(m) (or the obtained moving distance particulate number MDN(m)) is proper. In step S37 as well, the vehicle control section 1600 compares the obtained moving distance particulate weight MDW(m) with a judgment threshold value THW as in step S13 of the embodiment. In the case where MDW(m)≥THW, the vehicle control section 1600 judges that the filter DPF is normal (OK). Meanwhile, in the case where MDW(m)>THW, the vehicle control section 1600 judges that the filter DPF is broken (NG). The vehicle control section 1600 which executes the processing in step S37 corresponds to the judgment section 1680. Notably, in the case where the moving distance particulate number MDN(m) is used, similarly, the vehicle control section 1600 compares the moving distance particulate number MDN(m) with the judgment threshold value THN, and judges that the filter DPF is NG when MDN(m)>THN.

In the case where the vehicle control section 1600 judges in step S38 that the result of the judgment in step S37 is "OK" (No), the vehicle control section 1600 returns to step S24 via steps S28 and S29. As a result, the obtainment of the sensor output current value Ss(n), etc. are performed again.

Meanwhile, in the case where the vehicle control section 1600 makes a "Yes" judgment in step S38; i.e., the result of the judgment in step S37 is "NG," the vehicle control section 1600 proceeds to step S40.

In step S40, the vehicle control section 1600 judges whether or not the NG judgment in step S37 has occurred continuously a predetermined number of times (in the present modification, 10 times). In the case where the result of the judgment in step S40 is "No"; i.e., the number of times of the NG judgment has not yet reached 10 times, the vehicle control section 1600 proceeds to step S28 and continuously performs the detection. Meanwhile, in the case where the result of the judgment in step S40 is "Yes"; i.e., the number of times of the NG judgment has reached the predetermined number of times (10 times in the present embodiment), the vehicle control section 1600 proceeds to step S41.

In step S41, as a comprehensive judgment, the vehicle control section 1600 determines that the particulate collection characteristics of the filter DPF have deteriorated. In such a case, the vehicle control section 1600 turns on the warning display for a driver, which display is provided at a specific position within the dashboard (not shown). The vehicle control section 1600 which executes the processing in these steps S40 and S41 corresponds to the judgment determination section 1690.

In this particulate detection system 1010, the volumetric particulate weight MVW(n) (or the volumetric particulate number MVN(n)) of the particulates in the filtered exhaust gas FEG is measured, and in addition, the moving distance particulate weight MDW(m) (or the moving distance particulate number MDN(m)) is computed on the basis of the sensor output current value Ss(n), the period travel distance Dd(m) of the vehicle AM, and the flow rate Fd(n) (the moving integral flow rate SFd(m)) of the exhaust gas EG. Therefore, the moving distance particulate weight MDW(m) (or the moving distance particulate number MDN(m)) for the judgment as to whether the particulate collection characteristics of the filter DPF are normal or anomalous can be obtained easily. Also, through use of the moving distance particulate weight MDW(m), a deterioration in the particulate collection characteristics of the filter DPF can be detected easily.

In this particulate detection system 1010, the moving volumetric particulate weight SMVW(m) (or the moving volumetric particulate number SMVN(n)) over each moving detection period SP(m) is obtained in step S33 (the moving integration section 1660), and the moving distance particulate weight MDW(m) (or the moving distance particulate number MDN(m)) is then computed in the distance particulate amount computation section (the first moving computation section) 1670 on the basis of the moving volumetric particulate weight SMVW(m), the period travel distance Dd(m), and the flow rate Fd(n) (the moving integral flow rate SFd(m)). Therefore, the moving distance particulate weight MDW(m) (or the moving distance particulate number MDN(m)) averaged in the moving detection period SP(m) can be computed easily.

In the particulate detection system 1010, since the moving distance particulate weight MDW(m) (or the moving distance particulate number MDN(m)) in each moving detection period SP(m) is obtained in the distance particulate amount computation section (the first moving computation section) 1670, a long-term change in the distance particulate weight MDW (or the distance particulate number MDN) can be detected easily. As a result, a change in the sensor output current value Ss(n) due to breakage of the filter DPF (thus, a permanent change in the particulate collection characteristics) can be detected properly.

Also, in this system 1010, since the travel distance obtainment section 1620 and the flow rate obtainment section 1630 are further provided in the vehicle control section 1600, which is a computation section, the moving distance particulate weight MDW(m) (or the moving distance particulate number MDN(m)) in each moving detection period SP(m) can be computed more easily.

Notably, as described above, the "moving period" MP, which is the magnitude of the shift of the start timing of the moving detection period SP(m) in the present first modification is 60 seconds (=one minute) which is 600 times the sampling interval Ts (=0.1 second) for obtaining the sensor output current value Ss(n).

Since this particulate detection system 1010 includes the judgment section 1680 for judging whether the particulate collection characteristics of the filter DPF are normal or anomalous by using the computed moving distance particulate weight MDW(m) (or the computed moving distance particulate number MDN(m)), the judgment as to whether the filter DPF is normal or anomalous can be made appropriately by using the sensor output current value Ss(n) (sensor output) of the sensor 100.

In addition, in this particulate detection system 1010, the judgment determination section 1690 of the vehicle control section 1600 (computation section) finally determines that the filter DPF is anomalous in the case where the pattern of appearance of the judgment made in the judgment section 1680 and indicating presence of an anomaly satisfies a predetermined judgment condition (in the present first modification, in the case where the judgment condition that the NG judgment occurs ten times continuously is satisfied). Therefore, the judgment as to whether the filter DPF is normal or anomalous can be made more reliably.

In the present first modification, the length of the moving detection period SP(m) is set to 10 minutes. However, the moving detection period SP(m) may have any length so long as, as a result of the effect of averaging, the magnitude of the computed moving distance particulate amount MD(m) is not affected by a short-term change in the sensor output current value Ss(n). Preferably, the length of the moving detection period SP(m) is equal to or longer than 3 minutes.

In the present first modification, the moving period MP is 600 times the sampling interval Ts (=0.1 second) for obtainment of the sensor output current value Ss(n) (namely, the moving period MP is one minute). However, the moving period MP may be properly determined to fall within the range of 0.1 second (which is the same as the sampling interval Ts) to 2 minutes.

Second Modification

Next, a particulate detection system 2010 according to a second modification which slightly differs from the particulate detection system 10 of the above-described embodiment will be described with reference to FIGS. 11 and 12. In the particulate detection system 10 of the above-described embodiment, the sensor output current value Ss is obtained over the detection period SP (in the embodiment, from the start of travel to the stoppage of the vehicle), and the volumetric particulate weight MVW (or the volumetric particulate number MVN) is computed. In addition, the integral flow rate SFd of the exhaust gas EG discharged during this detection period SP, and the period travel distance Dd which is the distance of travel of the vehicle AM during this detection period SP is obtained, and the distance particulate weight MDW (or the distance particulate number MDN) is computed.

In contrast, in the particulate detection system 2010 of the present second modification, the sensor output current value Ss is obtained over a detection travel period DP, by the end of which the travel distance Dr of the vehicle AM becomes equal to or greater than a predetermined detection travel distance DDT (in the present second modification, for example, DDT=1 km), and the integral volumetric particulate weight SMVW (or the integral volumetric particulate number SMVN) is computed. In addition, the integral flow rate SFd of the exhaust gas EG over this detection travel period DP, and the travel distance Dr over which the vehicle AM travels during this detection travel period DP are obtained, and the distance particulate weight MDW (or the distance particulate number MDN) is computed. The particulate detection system 2010 of the present second modification differs from the particulate detection system 10 of the embodiment in the above-described point.

Therefore, in the below, portions of the particulate detection system 2010 of the present second modification which differ from those of the particulate detection system 10 of the embodiment will be mainly described, and the description of portions of the particulate detection system 2010 identical with those of the particulate detection system 10 will be omitted or simplified.

Figure 11:
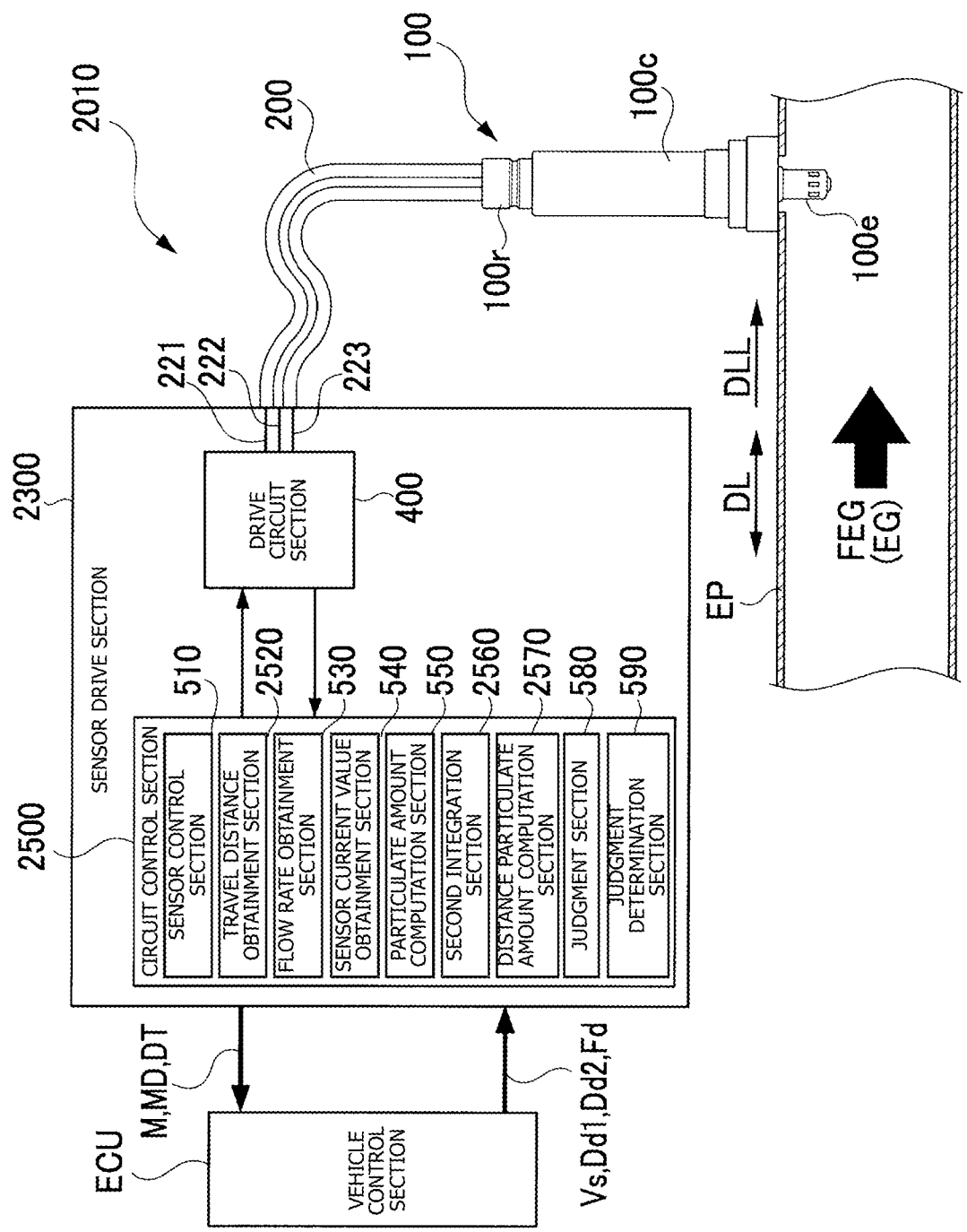
FIG. 11 shows the second modification and is an explanatory view of the particulate detection system whose sensor is attached to the exhaust pipe.
Figure 12:
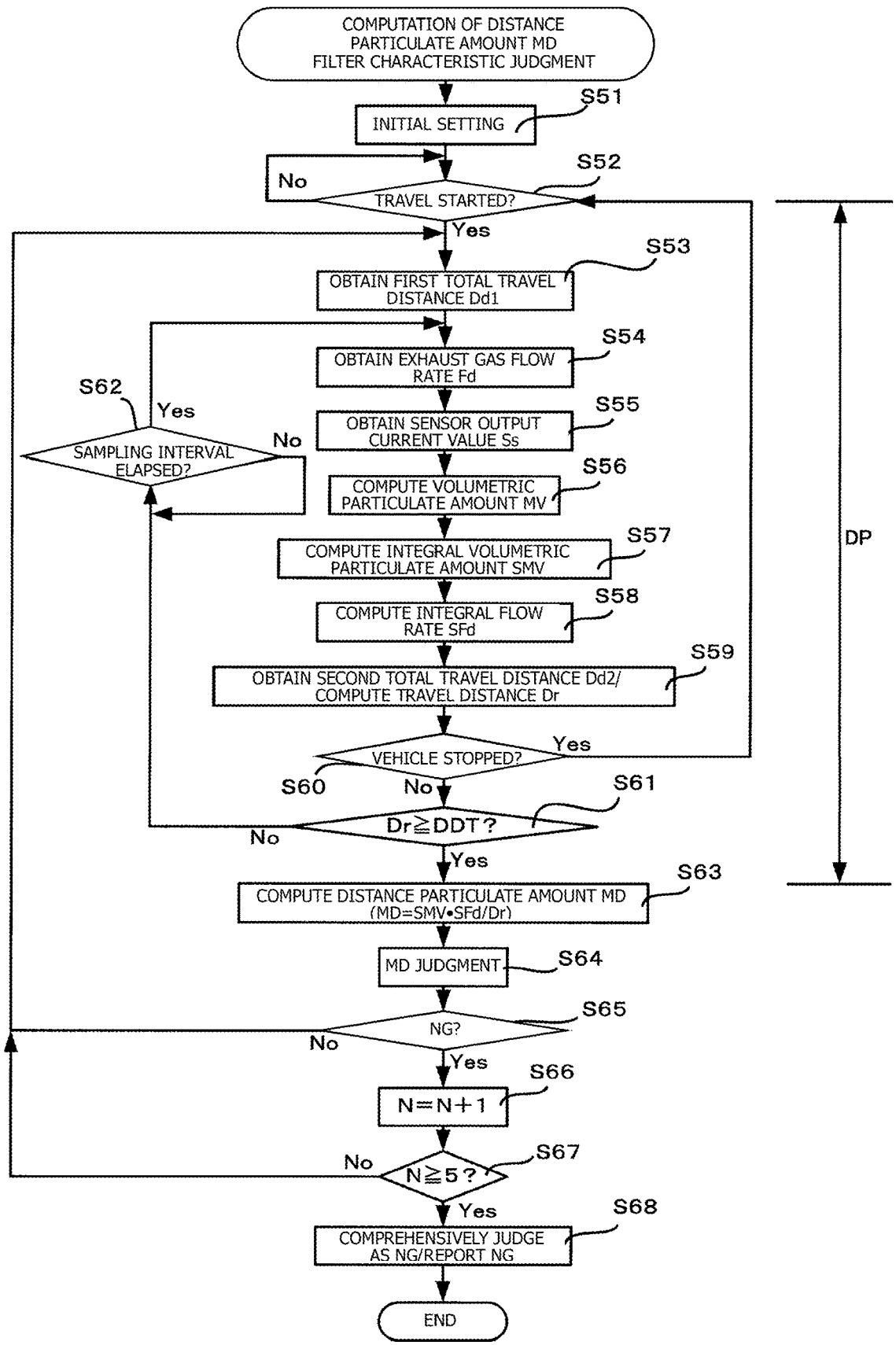
FIG. 12 shows the second modification and is a flowchart showing the steps for computation of the distance particulate amount MD (the distance particulate weight MDW or the distance particulate number MDN) and judgment of the characteristics of a filter DPF.

In the vehicle AM according to the present second modification, as in the case of the embodiment, a particulate detection system 2010 which includes the sensor 100, a circuit section 2300, and the cable 200 for establishing the electrical connection therebetween is mounted, and the vehicle control section ECU is provided externally of the system (see FIG. 11). Since the sensor 100, the cable 200, and the drive detection circuit section 400 of the circuit section 2300 are identical with those in the embodiment, their descriptions will not be repeated. The circuit section 2300 includes a circuit control section 2500 which controls the drive detection circuit section 400, obtains the sensor output current value Ss, computes the volumetric particulate weight MVW (or the volumetric particulate number MVN), computes the distance particulate weight MDW (or the distance particulate number MDN), and outputs the volumetric particulate weight MVW (or the volumetric particulate number MVN) to the vehicle control section ECU. Like the circuit control section 500 of the embodiment, the circuit control section 2500 is a microcomputer including a CPU, a ROM, a RAM, etc., and operates in accordance with a predetermined control program.

As in the case of the embodiment, the sensor control section 510 of the circuit control section 2500 controls the drive detection circuit section 400. The sensor current value obtainment section 540 of the circuit control section 2500 also obtains, at intervals of the sampling interval Ts (=0.1 sec), the signal input from the sensor current measurement circuit 740 and representing the sensor output current value Ss. The particulate amount computation section 550 of the circuit control section 2500 computes the volumetric particulate weight MVW (or the volumetric particulate number MVN) of the particulates S contained in the filtered exhaust gas FEG. Subsequently, the circuit control section 2500 sends the volumetric particulate weight MVW (or the volumetric particulate number MVN) to the vehicle control section ECU. As in the case of the embodiment, the circuit control section 2500 realizes a travel distance obtainment section 2520, the flow rate obtainment section 530, a second integration section 2560, distance particulate amount computation section 2570, the judgment section 580, and the judgment determination section 590.

The computation of the distance particulate weight MDW (or the distance particulate number MDN) and the judgment of the characteristics of the filter DPF in the system 2010 of the present second modification will now be described. When the CPU of the circuit section 2300 (the circuit control section 2500) starts upon startup of the vehicle AM, after performing initial setting in step S51, in step S52, the circuit control section 2500 waits until the vehicle AM starts its travel.

When the vehicle AM starts its travel (starting of the vehicle) (Yes), the circuit control section 2500 proceeds to step S53 and obtains the first total travel distance Dd1 from the vehicle control section ECU as in the case of the embodiment. The first total travel distance Dd1 is the total travel distance at that point in time (the point in time when the vehicle AM has started its travel), which is computed by the vehicle control section ECU. The circuit control section 2500 which executes the processing in this step S53 and the processing in step S59 which will be described later corresponds to the travel distance obtainment section 2520. Notably, the vehicle control section ECU always computes the total travel distance after the vehicle AM was manufactured by, for example, detecting the number of rotations of the wheels on the basis of an output signal from an axle rotation sensor (not shown) attached to the axle of the vehicle AM.

In step S54 subsequent thereto, as in the case of the embodiment, the circuit control section 2500 obtains the flow rate Fd of the exhaust gas EG flowing through the exhaust pipe EP at that point in time. The circuit control section 2500 which executes the processing in this step S54 and the processing in step S58 which will be described later corresponds to the flow rate obtainment section 530.

Furthermore, in step S55, the circuit control section 2500 obtains the sensor output current value Ss at that point in time. The circuit control section 2500 which executes the processing in this step S55 corresponds to the sensor current value obtainment section 540.

In step S56 subsequent thereto, as in the case of the embodiment, the circuit control section 2500 computes the volumetric particulate weight MVW of the filtered exhaust gas FEG at that point in time from the sensor output current value Ss obtained in step S55, and sends the volumetric particulate weight MVW to the vehicle control section ECU. The circuit control section 2500 which executes the processing in this step S56 corresponds to the particulate amount computation section 550. Notably, a volumetric particulate number MVN may be computed from the sensor output current value Ss and be sent to the vehicle control section ECU as a volumetric particulate amount MV.

Furthermore, in step S57, as in the case of the embodiment, the circuit control section 2500 computes an integral volumetric particulate weight SMVW (or an integral volumetric particulate number SMVN) by integrating the obtained volumetric particulate weight MVW (or the obtained volumetric particulate number MVN). Specifically, the circuit control section 2500 obtains a new integral volumetric particulate weight SMVW by adding the volumetric particulate weight MVW newly obtained to the already obtained integral volumetric particulate weight SMVW (SMVW=SMVW+MVW). Notably, in the case where the integral volumetric particulate number SMVN is computed through use of the volumetric particulate number MVN, the integral volumetric particulate number SMVN is computed in a similar manner (SMVN=SMVN+MVN).

However, unlike the embodiment, in the present second modification, as will be described later, this integration is performed over the detection travel period Dp, by the end of which the travel distance Dr becomes equal to or greater than the detection travel distance DDT. The circuit control section 2500 which executes the processing in this step S57 corresponds to the second integration section 2560.

Subsequently, in step S58, the circuit control section 2500 computes an integral flow rate SFd by integrating the flow rate Fd of the exhaust gas EG obtained in step S55. Specifically, the circuit control section 2500 obtains a new integral flow rate SFd by adding the flow rate Fd newly obtained to the already obtained integral flow rate SFd (SFd=SFd+Fd). The circuit control section 2500 which executes the processing in step S55 and the processing in S58 corresponds to the flow rate obtainment section 530. However, in the present second modification, this integration is performed over the detection travel period DP, by the end of which the travel distance Dr becomes equal to or greater than the detection travel distance DDT.

In step S59, unlike the embodiment (see FIG. 7), the circuit control section 2500 obtains the second total travel distance Dd2 (the total travel distance at that point in time) from the vehicle control section ECU at intervals equal to the sampling interval Ts. The circuit control section 2500 then computes the travel distance Dr (km) (from the start of the travel) at that point in time by subtracting the first total travel distance Dd1 from the second total travel distance Dd2 (Dr=Dd2−Dd1). The circuit control section 2500 which executes the processing in step S53 and the processing in step S59 corresponds to the travel distance obtainment section 2520.

After that, in step S60, the circuit control section 2500 judges whether or not the vehicle AM has stopped (the speed of the vehicle AM). In the case where the vehicle AM is in a stopped state (Yes), the circuit control section 2500 proceeds to step S52 so as to wait until the vehicle starts its travel. After the travel is started again, the circuit control section 2500 again performs the obtainment of the sensor output current value Ss, the computation of the volumetric particulate weight MVW (or the volumetric particulate number MVN), the computation of the travel distance Dr, etc. As a result, the previously obtained or computed values are erased as a result of overwriting. This is because the travel distance Dr does not reach the detection travel distance DDT (in the present second modification, DDT=1 km), and therefore, the above-mentioned values are measured again.

Meanwhile, in the case where the vehicle AM is not in a stopped state (is travelling) (No), the circuit control section 2500 proceeds to step S61.

In step S61, the circuit control section 2500 judges whether or not the travel distance Dr obtained in step S59 becomes equal to or greater than the detection travel distance DDT (in the present second modification, DDT=1 km). In the case where the result of the judgment is "No"; i.e., the travel distance Dr has not yet reached the detection travel distance DDT (=1 km), the circuit control section 2500 proceeds to step S62. In step S62, the circuit control section 2500 waits for the elapse of the sampling interval Ts. After elapse of the sampling interval Ts (in the case of Yes), the circuit control section 2500 returns to step S54, and again repeats the processing in step S54 to S60, such as obtainment of the sensor output current value Ss (step S55). As a result, until the travel distance Dr obtained in step S59 becomes equal to or greater than the predetermined detection travel distance DDT (in the present second modification, DDT=1 km) (Yes in step S61), the circuit control section 2500 continuously computes the integral volumetric particulate weight SMVW (or the integral volumetric particulate number SMVN) from the sensor output current value Ss every time the sampling interval Ts elapses. Also, the circuit control section 2500 continuously computes the integral flow rate SFd from the flow rate Fd.

Meanwhile, in the case where the travel distance Dr has become equal to or greater than the predetermined detection travel distance DDT (Yes in step S61), the circuit control section 2500 proceeds to step S63. The travel distance Dr of the vehicle AM at this point in time is equal to or slightly greater than the detection travel distance DDT.

In step S63, the circuit control section 2500 computes the distance particulate weight MDW (mg/km) (or the distance particulate weight MDN (pcs/km)) in the detection travel period DP. Specifically, the circuit control section 2500 computes the distance particulate weight MDW by using the integral volumetric particulate weight SMVW based on the sensor output current value Ss, the travel distance Dr of the vehicle AM, and the integral flow rate SFd of the exhaust gas EG in the detection travel period DP (MDW=SMVW·SFd/Dr). As a result, the distance particulate weight MDW during the detection travel period DP is obtained. The circuit control section 2500 which executes the processing in step S63 corresponds to the distance particulate amount computation section (the second computation section) 2570.

Notably, in the case where the distance particulate number MDN (pcs/km) in the detection travel period DP is computed, the distance particulate number MDN is computed through use of a similar equation (MDN=SMVN·SFd/Dr).

The processing in step S64 and steps subsequent thereto is approximately the same as that in step S13 and steps subsequent thereto in the embodiment. Namely, in step S64, the vehicle control section 2500 judges whether or not the magnitude of the obtained distance particulate weight MDW (or the obtained distance particulate number MDN) is proper. Specifically, in step S64, the circuit control section 2500 compares the obtained distance particulate weight MDW with the judgment threshold value THW so as to judge whether or not the filter DPF is OK or NG. Specifically, in the case where MDW>THW, the circuit control section 2500 judges that the filter DPF is NG (the filter DPF is broken). The circuit control section 2500 which executes the processing in step S64 corresponds to the judgment section 580. Notably, in the case where the distance particulate number MDN is used, similarly, the circuit control section 2500 compares the distance particulate number MDN with the judgment threshold value THN, and judges that the filter DPF is NG when MDN>THN.

In the case where the circuit control section 2500 judges in step S65 that the result of the judgment in step S64 is "OK" (No), the circuit control section 2500 proceeds to step S53, and again performs the measurement of the volumetric particulate weight MVW (or the volumetric particulate number MVN) in a new detection travel period DP. Meanwhile, in the case where the circuit control section 2500 makes a "Yes" judgment in step S65; i.e., the result of the judgment in step S64 is "NG," the circuit control section 2500 proceeds to step S66.

In step S66, the circuit control section 2500 increases, by one, the NG detection number of times N which represents the number of times of the NG judgment (N=N+1).

In step S67 subsequent thereto, the circuit control section 2500 judges whether or not the NG detection number of times N is equal to or greater than a predetermined number of times (in the present embodiment, 5 times). In the case where the circuit control section 2500 makes a "No" judgment in step S67; i.e., the NG detection number of times N is less than 5 times, the circuit control section 2500 returns to step S53. Meanwhile, in the case where the circuit control section 2500 makes a "Yes" judgment in step S67; i.e., the NG detection number of times N has reached 5 times, the circuit control section 2500 proceeds to step S68. In step S68, as a comprehensive judgment, the circuit control section 2500 determines that the particulate collection characteristics of the filter DPF have deteriorated and sends to the vehicle control section ECU an NG notification signal DT representing that the particulate collection characteristics of the filter DPF have deteriorated.

In response thereto, as in the case of the embodiment, the vehicle control section ECU performs a predetermined warning display or the like. The circuit control section 2500 which executes the processing in these steps S66 to S68 corresponds to the judgment determination section 590.

As described above, in this system 2010 as well, the distance particulate weight MDW (or the volumetric particulate number MVN) is computed on the basis of the sensor output current value Ss, the travel distance Dr of the vehicle AM, and the flow rate Fd of the exhaust gas EG. Therefore, the distance particulate weight MDW (or the volumetric particulate number MVN) for the judgment as to whether the particulate collection characteristics of the filter DPF are normal or anomalous can be obtained easily. Also, through use of the distance particulate weight MDW, a deterioration in the particulate collection characteristics of the filter DPF can be easily detected.

In this system 2010, on the basis of the integral volumetric particulate weight SMVW (or the integral volumetric particulate number SMVN), the travel distance Dr, and the flow rate Fd (the integral flow rate SFd), the distance particulate weight MDW (or the distance particulate number MDN) is computed in the distance particulate amount computation section (the second computation section) 2570. Therefore, the distance particulate weight MDW (the distance particulate number MDN) averaged in the detection travel period DP can be computed easily.

Also, in this system 2010, since the circuit control section (the computation section) 2500 further includes the travel distance obtainment section 2520 and the flow rate obtainment section 530, the distance particulate weight MDW (or the distance particulate number MDN) in the detection travel period DP can be computed more easily.

Since this particulate detection system 2010 includes the judgment section 580 for judging whether the particulate collection characteristics of the filter DPF are normal or anomalous by using the computed distance particulate weight MDW (or the computed distance particulate number MDN), the judgment as to whether the filter DPF is normal or anomalous can be made appropriately by using the sensor output current value Ss (sensor output) of the sensor 100.

In addition, in this particulate detection system 2010 as well, the judgment determination section 590 finally determines that the filter DPF is anomalous upon satisfaction of the judgment condition that the judgment section 580 makes the NG judgment five times. Therefore, the judgment as to whether the filter DPF is normal or anomalous can be made more reliably.

In the above, the present invention has been described on the basis of its embodiment and first and second modifications. However, needless to say, the present invention is not limited to the above-described embodiment and first and second modifications, and may be modified freely without departing from the scope of the present invention.

In the embodiment and the first and second modifications, the distance particulate weight MDW (or the distance particulate number MDN) is computed through use of the period travel distance Dd or the travel distance Dr, the flow rate Fd, and the sensor output current value Ss obtained through use of the sensor 100 of a type in which discharge is generated in the gas under measurement EI so as to produce ions CP, and the ions CP are caused to adhere to the particulates S, as in the system disclosed in Japanese Unexamined Publication No. 2015-129711.

However, the distance particulate weight MDW (or the distance particulate number MDN) may be computed through use of the period travel distance Dd or the travel distance Dr and the flow rate Fd, as well as the sensor output current value Ss obtained through use of a sensor of a type in which a pump for supplying a clean gas is provided, discharge is generated in the clean gas so as to produce ions, and the ions are caused to adhere to particulates, as in the systems disclosed in Japanese Unexamined Publications No. 2012-220423 and No. 2012-194078.

Also, the distance particulate weight MDW (or the distance particulate number MDN) may be computed through use of the period travel distance Dd or the travel distance Dr, the flow rate Fd, and the sensor output Ss obtained by a particulate detection system of a different type which utilizes electrified particulates in exhaust gas, as in the systems disclosed in WO 2012/161754.

In the embodiment and the first and second modifications, the volumetric particulate weight MVW (or the volumetric particulate number MVN) is computed through use of the sensor output current value Ss, and the volumetric particulate weight MVW (or the volumetric particulate number MVN) is integrated, whereby the distance particulate weight MDW (or the distance particulate number MDN) is obtained.

However, without using the process for obtaining the volumetric particulate weight MVW (or the volumetric particulate number MVN), the distance particulate weight MDW (or the distance particulate number MDN) may be obtained by using, in addition to the sensor output current value Ss, the period travel distance Dd or the travel distance Dr and the flow rate Fd.

DESCRIPTION OF REFERENCE NUMERALS AND SYMBOLS 10, 1010, 2010: particulate detection system
100: sensor
300, 1300, 2300: circuit section
400: drive detection circuit section (sensor circuit section)
500, 1500, 2500: circuit control section (sensor circuit section, computation section)
510: sensor control section
520, 1620, 2520, S3, S11, S23, S31, S35, S53, S59: travel distance obtainment section
Dd, Dd(m): period travel distance (travel distance) (of vehicle)
Dd1, Dd1(m), Dd2: total travel distance (travel distance data)
Dr: travel distance
DDT: detection travel distance
DP: detection travel period
530, 1630, S4, S8, S24, S34, S54, S58: flow rate obtainment section
540, S5, S25, S55: sensor current value obtainment section 550, S6, S26, S56: particulate amount computation section
560, S7, S57: first integration section
1660, S33: moving integration section (first integration section)
2560, S57: second integration section
570, S8, S11, S12: distance particulate amount computation section (first computation section)
1670, S36: distance particulate amount computation section (first moving computation section)
2570, S63: distance particulate amount computation section (second computation section)
580, 1680, S13, S37, S64: judgment section
590, 1690, S15 to S17, S40, S41, S66 to S68: judgment determination section
SP: detection period
SP(m): moving detection period (detection period)
MP: moving period
MD: distance particulate amount
MDW: distance particulate weight
MDN: distance particulate number
MD(m): moving distance particulate amount
MDW(m): moving distance particulate weight
MDN(m): moving distance particulate number
N: number of times of NG detection
DT: NG notification signal
740: sensor current measurement circuit (sensor current value obtainment section)
AM: vehicle
ECU: vehicle control section (outside)
1600: vehicle control section (computation section)
Vs: vehicle speed signal
EP: exhaust pipe
DLL: downstream side (of exhaust pipe)
EG: exhaust gas
FEG: filtered exhaust gas
EI: gas under measurement
EIF: flow of gas under measurement
S: particulate
DPF: filter
FS: flow rate sensor
Fd, Fd(n): flow rate (of exhaust gas) (flow rate data)
SFd: integral flow rate (of exhaust gas in detection period)
SFd(m): moving integral flow rate (integral flow rate) (of exhaust gas in moving detection period)
Is: sensor output current
Ss: sensor output current value (sensor output)
Ts: sampling interval (time interval)
M: amount of particulates (of exhaust gas (gas under measurement))
MV, MV(n): volumetric particulate amount
MVW, MVW(n): volumetric particulate weight
MVN, MVN(n): volumetric particulate number
SMV: integral volumetric particulate amount
SMV(m): moving volumetric particulate amount (moving integral volumetric particulate amount)
SMVW: integral volumetric particulate weight (integral volumetric particulate amount)
SMVW(m): moving volumetric particulate weight (integral volumetric particulate amount, moving integral volumetric particulate amount)
SMVN: integral volumetric particulate number (integral volumetric particulate amount)
SMVN(m): moving volumetric particulate number (integral volumetric particulate amount, moving integral volumetric particulate amount)

The invention claimed is:

1. A particulate detection system for detecting an amount of particulates contained in filtered exhaust gas discharged from an engine of a vehicle, the system comprising:
a sensor disposed on a downstream side of a filter that collects the particulates from an exhaust gas to form the filtered exhaust gas;
a sensor circuit section which drives the sensor and obtains in real time a sensor output corresponding to a volumetric particulate amount of the particulates contained in the filtered exhaust gas; and
a computation section which computes a distance particulate amount which is a weight or number of the particulates discharged per unit travel distance based on the sensor output, a travel distance of the vehicle, and a flow rate of the exhaust gas, wherein
the computation section includes a judgment section which makes a judgement whether or not particulate collection characteristics of the filter are anomalous based on the computed distance particulate amount.

2. The particulate detection system according to claim 1, wherein the computation section includes:
a particulate amount computation section which computers the volumetric particulate amount using the sensor output obtained at predetermined time intervals;
a first integration section which integrates the volumetric particulate amount over a predetermined detection period to thereby compute an integral volumetric particulate amount in the detection period; and
a first computation section which computes the distance particulate amount based on the integral volumetric particulate amount, the travel distance, and the flow rate.

3. The particulate detection system according to claim 2, wherein
the detection period is a moving detection period which has a fixed length and whose start timing shifts by a predetermined moving period each time,
the first integration section is configured to compute a moving integral volumetric particulate amount, which is the integral volumetric particulate amount for each moving detection period, and
the first computation section is configured to compute a moving distance particulate amount, which is the distance particulate amount for each moving detection period.

4. The particulate detection system according to claim 2, wherein the computation section includes:
a travel distance obtainment section which externally obtains the travel distance over which the vehicle has travelled during the detection period, or computes the travel distance from travel distance data externally obtained; and
a flow rate obtainment section which externally obtains the flow rate of the exhaust gas discharged from the engine during the detection period, or computes the flow rate from flow rate data externally obtained.

5. The particulate detection system according to claim 1, wherein the computation section includes:
a particulate amount computation section which computers the volumetric particulate amount using the sensor output obtained at predetermined time intervals;
a second integration section which integrates the volumetric particulate amount over a detection travel period to compute an integral volumetric particulate amount in the detection travel period, said detection travel period corresponding to a distance equal to or greater than a predetermined detection travel distance; and a second computation section which computes the distance particulate amount based on the integral volumetric particulate amount, the travel distance, and the flow rate.

6. The particulate detection system according to claim 5, wherein the computation section includes:
   a travel distance obtainment section which externally obtains the travel distance over which the vehicle has travelled, or computes the travel distance from data externally obtained; and
   a flow rate obtainment section which externally obtains the flow rate of the exhaust gas discharged during the detection travel period, or computes the flow rate from data externally obtained.

7. The particulate detection system according to claim 1, wherein the computation section includes:
   a judgment determination section which determines that the filter is anomalous when a judgement pattern by the judgment section satisfies a predetermined judgment condition.

* * * * *